United States Patent [19]

Schrader et al.

[11] 4,167,462
[45] Sep. 11, 1979

[54] ELECTRODE DRIVE AND CONTROLS FOR ELECTROCHEMICAL MACHINING

[75] Inventors: Gustav E. Schrader, Pepper Pike; Karl Scheucher, Willoughy, both of Ohio; William S. Cornyn, Rancho Palos Verdes; Robert E. Rea, Torrance, both of Calif.

[73] Assignee: TRW Inc., Cleveland, Ohio

[21] Appl. No.: 787,596

[22] Filed: Apr. 14, 1977

[51] Int. Cl.² ............................ B23P 1/04; B23P 1/14
[52] U.S. Cl. ........................... 204/129.25; 204/129.5; 204/224 M; 204/225; 204/228
[58] Field of Search ................. 204/129.5, 224 M, 225, 204/228, 129.25

[56] References Cited

U.S. PATENT DOCUMENTS

| | | | |
|---|---|---|---|
| 3,444,070 | 5/1969 | Williams | 204/129.25 X |
| 3,554,892 | 1/1971 | Schellens et al. | 204/224 M X |
| 3,827,963 | 8/1974 | Callahan | 204/228 |
| 3,859,186 | 1/1975 | Ullmann et al. | 204/224 M X |

FOREIGN PATENT DOCUMENTS

| | | | |
|---|---|---|---|
| 4120205 | 11/1966 | Japan | 204/129.25 |
| 1029233 | 5/1966 | United Kingdom | 204/224 M |
| 1093932 | 12/1967 | United Kingdom | 204/129.25 |
| 197380 | 8/1967 | U.S.S.R. | 204/225 |
| 229922 | 3/1969 | U.S.S.R. | 204/224 M |

Primary Examiner—John H. Mack
Assistant Examiner—D. R. Valentine

[57] ABSTRACT

An improved apparatus for electrolytically removing material from a workpiece includes a plurality of electrodes which are movable relative to each other through working strokes. In order to coordinate the movement of the electrodes, they are stopped at one or more predetermined intermediate positions during their working strokes. When all of the electrodes have arrived at intermediate positions, the electrodes are simultaneously moved away from their intermediate positions toward their end of stroke positions. In order to accommodate variations in the rate at which material is electrolytically removed from a workpiece, the speed of movement of the electrodes and/or the electrical potential established between the electrodes and the workpiece can be varied. Relatively large diameter rams connected with the electrodes are supplied with fluid from relatively small diameter piston and cylinder type pumps. During each electrode working stroke, the piston and cylinder type pumps are driven through a plurality of pumping strokes by reversible driving motors which are connected with the pumps by relatively short linear ball screw and nut drive arrangements. To insure that a reversal in the direction of operation of a typical screw and nut drive arrangement does not occur during the final portion of a working stroke, each of the electrodes is stopped at an intermediate position shortly before the end of its working stroke.

62 Claims, 18 Drawing Figures

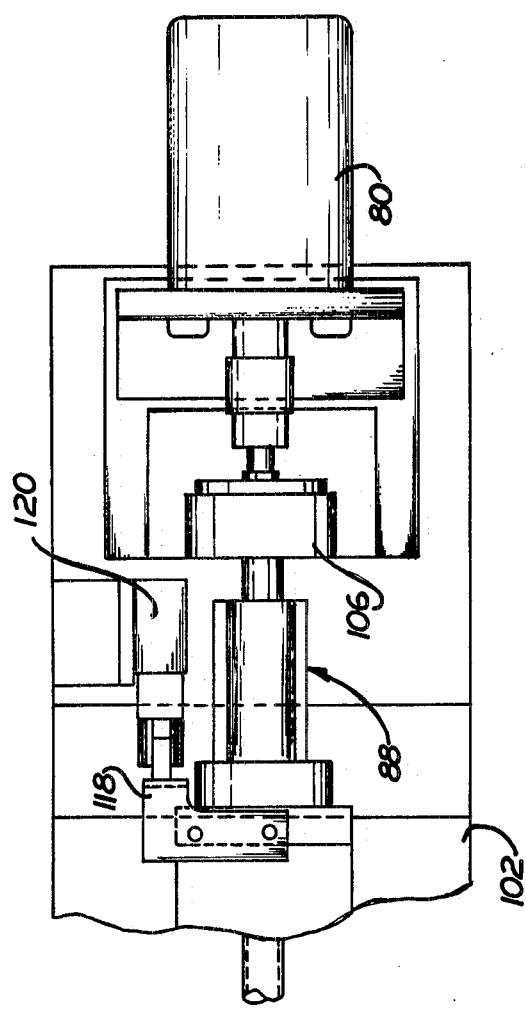
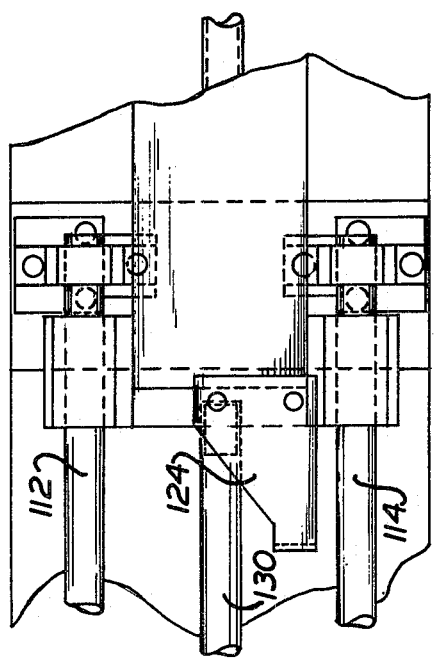
FIG.4

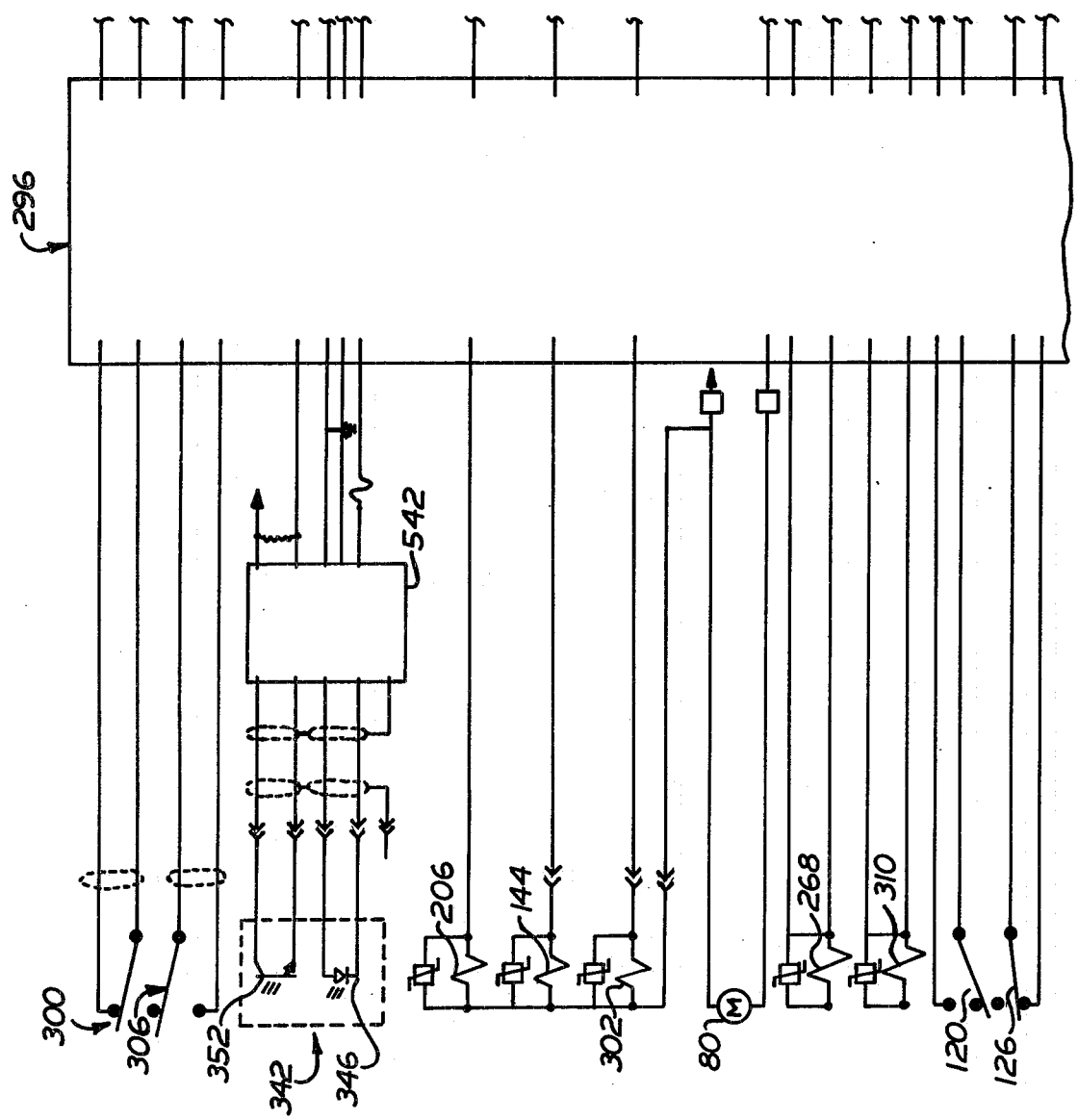

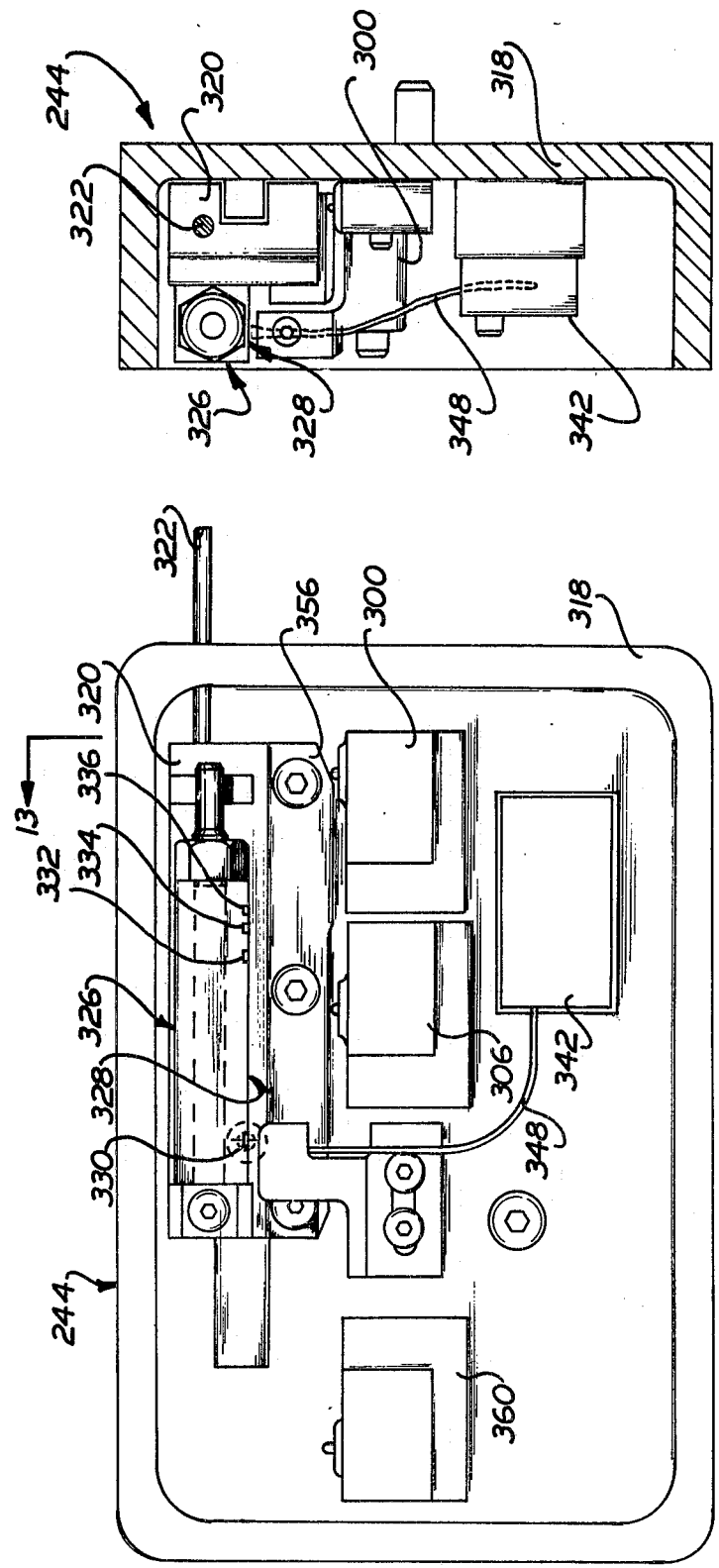

ELECTRODE DRIVE AND CONTROLS FOR ELECTROCHEMICAL MACHINING

BACKGROUND OF THE INVENTION

This invention relates generally to an improved apparatus for use in electrolytically removing material from a workpiece and more specifically to an apparatus utilized in associated with electrodes which are movable through working strokes during the electrolytic removal of material from a workpiece.

A known apparatus having one or more electrodes to electrolytically remove material from a workpiece is disclosed in U.S. Pat. No. 3,287,245. The apparatus disclosed in U.S. Pat. No. 3,287,245 contemplates that an electrode will be moved from a retracted position to a beginning of working stroke position at a relatively high speed by a screw and nut drive arrangement. When the electrode has been moved at a high speed to a position closely adjacent to the workpiece, the speed of movement of the electrode is reduced and the electrode is moved through a working stroke at a constant speed. A plurality of different devices are provided to sense when the electrode has been moved through a high speed approach stroke and is about to begin a work stroke.

Another apparatus for moving an electrode at a relatively high speed to a beginning of work stroke position and for thereafter moving the electrode at a constant speed is disclosed in U.S. Pat. No. 3,275,543. Other machines having movable electrodes are disclosed in U.S. Pat. Nos. 3,372,099; 3,459,645; 3,466,235; 3,506,559; 3,547,797; 3,746,632 and 3,753,890. Various drive arrangements associated with machines other than machines for electrolytically removing material from a workpiece are disclosed in U.S. Pat. Nos. 1,907,208; 2,163,959 and 3,192,718.

It has been previously suggested to utilize optical or photoelectric sensors in association with an apparatus to adjust the position of the anode of an electrolytic cell in a manner disclosed in U.S. Pat. No. 3,902,983. It should be noted that the apparatus disclosed in U.S. Pat. No. 3,902,983 does not utilize the photoelectric device to detect the position of an electrode but merely detects when a voltage output of a cell is either at a high limit or a low limit. In addition, photoelectric devices have previously been utilized to determine when a weight connected with an electrode is in a predetermined position during the process of making the electrode (see U.S. Pat. No. 3,384,567). However, prior art machines for effecting electrolytic removal of material from a workpiece have not utilized photoelectric sensors to detect when an electrode is in a predetermined position during a working stroke.

SUMMARY OF THE PRESENT INVENTION

The present invention provides a new and improved apparatus having a plurality of electrodes which are movable to effect the electrolytic removal of material from a workpiece while an electrical potential is established between each of the electrodes and the workpiece and while electrolyte is flowing between each of the electrodes and the workpiece. Due to differences in rams used to move the electrodes, to differences in controls for regulating operation of the electrode drive rams, to temperature differentials between various components, to minor hydraulic fluid leaks, and other drive assembly differences, it is contemplated that certain electrodes may lag behind other electrodes as material is electrolytically removed from the workpiece. To coordinate the movement of the various electrodes, each of the electrodes is moved to predetermined intermediate positions between the beginning and end of stroke positions. Once all the electrodes have arrived at predetermined intermediate positions, they are simultaneously moved from their intermediate positions toward their end of stroke positions. The number of times the electrodes are stopped at intermediate positions between the beginning and end of stroke positions may vary depending upon the amount of material to be removed from the workpiece and other factors.

An electrode drive arrangement constructed in accordance with another feature of the present invention includes a relatively large electrode drive motor or ram which is supplied with fluid from the relatively small pump. Although other types of pumps could be utilized, it is preferred to use a piston and cylinder type pump. The pump has a piston which is moved through a plurality of pumping strokes to discharge a volume of fluid large enough to effect movement of the associated electrode ram through a distance corresponding to a working stroke of an electrode. Since positional error (although very small) may be introduced upon a reversal in the direction of movement of a pump piston, it is preferred to interrupt movement of the electrodes at predetermined intermediate positions to synchronize the positions of the electrodes. The pistons of the various pumps are then returned to beginning of pumping stroke positions. The pump pistons are then moved through portions of a single pumping stroke to discharge sufficient fluid to effect movement of the electrode rams through the short distance remaining in their working strokes. These single stroke distances are selected to assure electrochemical equilibrium in the final portion of the strokes and to thereby assure predictable end product geometry.

In accordance with still another feature of the present invention, a photoelectric detector unit is utilized in association with each of the electrodes. When an associated electrode is moved to a predetermined position, a mark is sensed by the associated photoelectric detector unit and output signal effects initiation of a control function. Thus, output signals from the photoelectric detector units are utilized to interrupt operation of the electrode drive assemblies when the electrodes have been moved to predetermined intermediate positions and to end of stroke positions. The detector units may also initiate changes in voltage, feed rate and other operating parameters of the system.

As an article is being formed by the electrolytic removal of material from a workpiece, it is contemplated that the effective surface area of the electrode may vary. Thus, during the formation of an initial portion of a turbine blade or other article by an electrode extending at an acute angle to the side surface of a workpiece, only a relatively small area on the leading end portion of the electrode will be effective during the electrolytic removal of material from the workpiece. As the turbine blade is formed, the size of the effective surface area of the electrode increases. In order to compensate for the changing effective surface area of the electrode and to provide for accurate finishing of a workpiece, it may be desirable to vary the speed of movement of the electrode relative to the workpiece and/or the electrical potential between the electrode and the workpiece.

Since the effective area of the leading end portion of the electrode will vary as a function of the position of the electrode relative to the workpiece, the speed of movement of the electrode and/or the electrical potential between the electrode and the workpiece may be varied when the electrode reaches a predetermined position relative to the workpiece.

Accordingly, it is an object of this invention to provide a new and improved apparatus having a plurality of electrodes which are moved through working strokes relative to a workpiece while an electrical potential is established between the electrodes and the workpiece to effect the electrolytic removal of material from the workpiece and wherein controls are provided to interrupt movement of the electrodes when they arrive at a predetermined intermediate position disposed between beginning and end of working stroke positions and to initiate simultaneous movement of the electrodes from their intermediate positions toward their end of stroke positions after all of the electrodes have arrived at their intermediate positions.

Another object of this invention is to provide a new and improved apparatus in which a plurality of electrodes move relative to a workpiece while electrical potential is established between each of the electrodes and the workpiece and while electrolyte is flowing between each of the electrodes and the workpiece and wherein the electrodes are moved by fluid motors which are supplied with fluid from pumps, each of the pumps being operated through one or more pumping strokes to discharge a volume of fluid sufficient to cause an electrode drive motor to move an electrode through a working stroke.

Another object of this invention is to provide a new and improved apparatus which includes a plurality of electrodes which are moved relative to a workpiece while an electrical potential is established between each of the electrodes and the workpiece and while electrolyte is flowing between each of the electrodes and the workpiece and wherein the electrodes are moved at a first speed during one portion of a working stroke to effect the electrolytic removal of material from a workpiece at a first rate and are moved at a second speed during another portion of the working stroke to effect the electrolytic removal of material from the workpiece at a second rate.

Another object of this invention is to provide a new and improved apparatus in which a plurality of electrodes are moved relative to a workpiece while an electrical potential is established between the electrodes and the workpiece and while electrolyte is flowing between each of the electrodes in the workpiece and wherein a plurality of photoelectric detectors are utilized to detect when each of the electrodes is in a predetermined position relative to the workpiece.

Another object of this invention is to provide a new and improved apparatus in which an electrode is moved relative to a workpiece while an electrical potential is established between the electrode and the workpiece and while electrolyte is flowing between the electrode and the workpiece and wherein the speed of movement of the electrode and/or the electrical potential between the workpiece and the electrode are varied in response to movement of the electrode to a predetermined position relative to the workpiece.

BRIEF DESCRIPTION OF THE DRAWINGS

The foregoing and other objects and features of the present invention will become more apparent upon a consideration of the following description taken in connection with the accompanying drawings wherein:

FIG. 4 is a plan view, taken generally along the line 4—4 of FIG. 3, further illustrating the construction of the pump drive apparatus;

FIG. 11 is a schematic illustration of control circuitry utilized in association with the machine of FIG. 1 to control the operation of the machine during the electrolytic removal of material from the workpiece;

FIG. 12 is a plan view of a detector unit utilized to detect when an electrode moves to predetermined positions;

FIG. 13 is a side view, taken generally along the line 13—13 of FIG. 12, further illustrating the construction of the detector unit;

DESCRIPTION OF SPECIFIC PREFERRED EMBODIMENTS OF THE INVENTION

Figure 1:
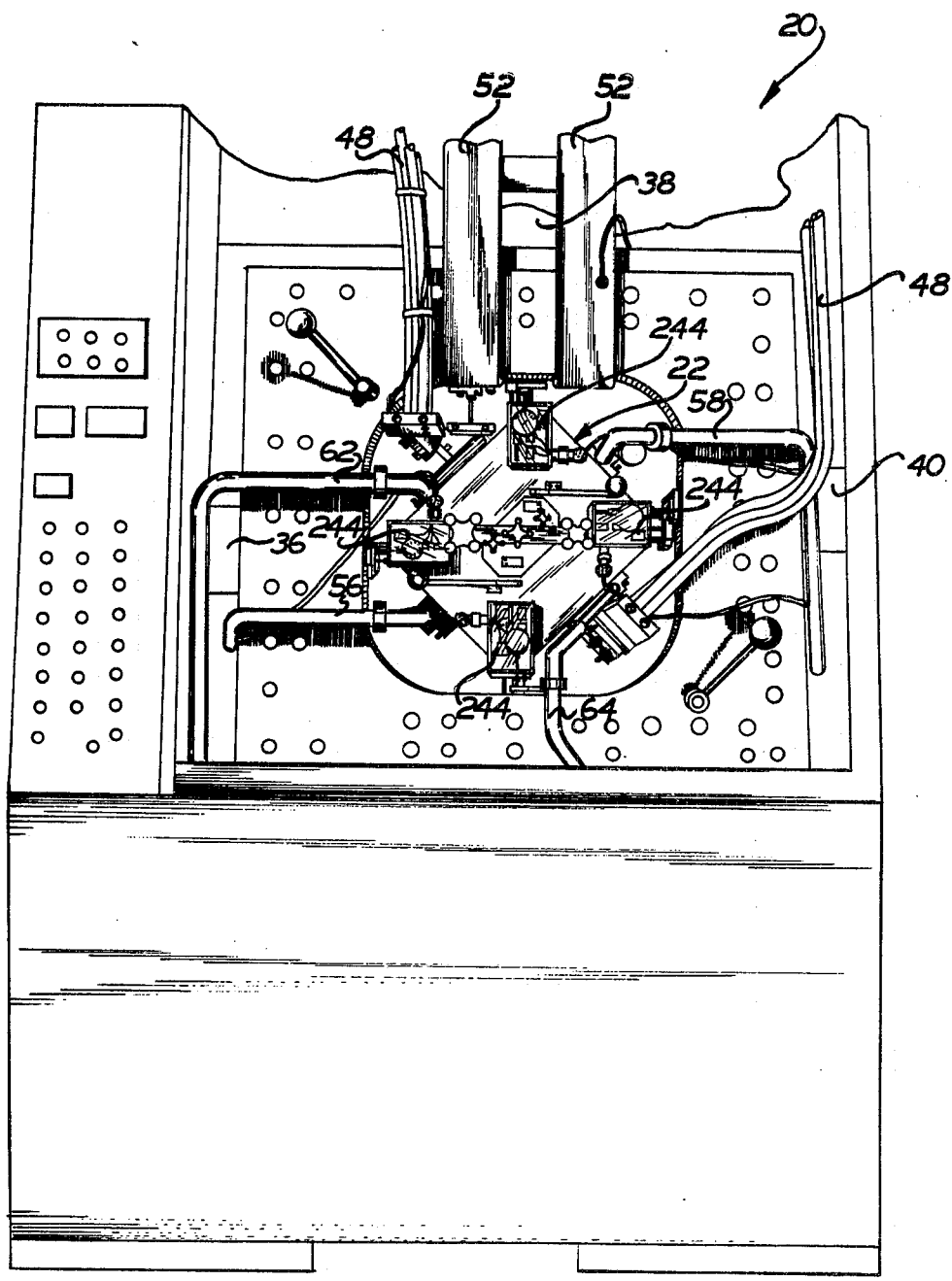
FIG. 1 is an illustration of a machine which is constructed in accordance with the present invention and is operable to effect the electrolytic removal of material from a workpiece.

A machine 20 for electrolytically removing material from a workpiece is illustrated in FIG. 1. The machine 20 includes a fixture module 22 which receives a workpiece 24 (see FIG. 2) in a chamber located within the module 22.

During operation of the machine 20, a plurality of electrodes 26, 28, 30 and 32 (see FIG. 2) are moved relative to the workpiece 24 by a plurality of fluid motors or rams 34, 36, 38 and 40. During movement of the electrodes 26-32 by the rams 34-40, an electrical potential is established between the electrodes 26-32 and the workpiece 24 by a rectifier illustrated schematically at 44 in FIG. 2. The rectifier 44 has a positive or anodic terminal which is connected with the workpiece by cables indicated at 48 in FIG. 1 and a fixture (not shown) which engages the workpiece. Similarly, the rectifier 44 has a negative or cathodic output terminal which is connected with the electrodes 26-32 by means of bus bars 52 (FIG. 1) and suitable cables and terminals. While the electrodes 26-32 are being moved relative to the workpiece 24, a flow of electrolyte is directed between the electrodes and the workpiece by conduits 56 and 58 (see FIGS. 1 and 2). A return flow of electrolyte is conducted from the working chamber by conduits 62 and 64 (FIG. 1). Of course, the direction of electrolyte flow could be reversed if desired.

Although the machine 20 could be utilized to form many different articles, it is advantageously utilized to form a plurality of airfoils in the manner disclosed in U.S. patent application Ser. No. 681,779, filed Apr. 30, 1976 by Gustav E. Schrader and entitled "Apparatus for Electrochemically Forming A Plurality of Articles". During the formation of the airfoils or other articles, a pair of electrodes 26 and 28 (FIG. 2) are utilized to remove material from opposite sides of the workpiece 24 to form one series of airfoils along an edge portion of the workpiece while the electrodes 30 and 32 are utilized in the electrolytic removal of material from opposite sides of the workpiece along an opposite edge portion of the workpiece to thereby form a second series of airfoils. The manner in which the electrodes 26-32 cooperate with each other and the workpiece 24 to form airfoils and other articles is fully disclosed in the aforementioned Schrader application and will not be further described herein to avoid prolixity of description.

In accordance with one specific feature of the present invention, the electrode rams 34, 36, 38 and 40 (FIG. 2) are driven under the influence of fluid supplied from a plurality of identical pumps 70, 72, 74 and 76 to accurately position the electrodes 26-32 relative to the workpiece 24. The pumps 70-76 are driven by reversible electric motors 80, 82, 84 and 86 through identical screw and nut drive arrangements 88, 90, 92 and 94. It should be noted that the screw and nut drive arrangements 88-94 have relatively short worms or screws 96 to minimize the effect of thermal expansion on the accuracy of the drive arrangements. The relatively short screw and nut drive arrangements have the advantage of being economical to produce since the cost of an accurately formed screw is a direct function of the length of the screw. Although identical pumps 70-76 and screw and nut drive arrangements 88-94 have been disclosed herein, it is contemplated that certain products may have a geometry which would make the use of pumps and/or drive arrangements which are not identical advantageous.

Figure 3:
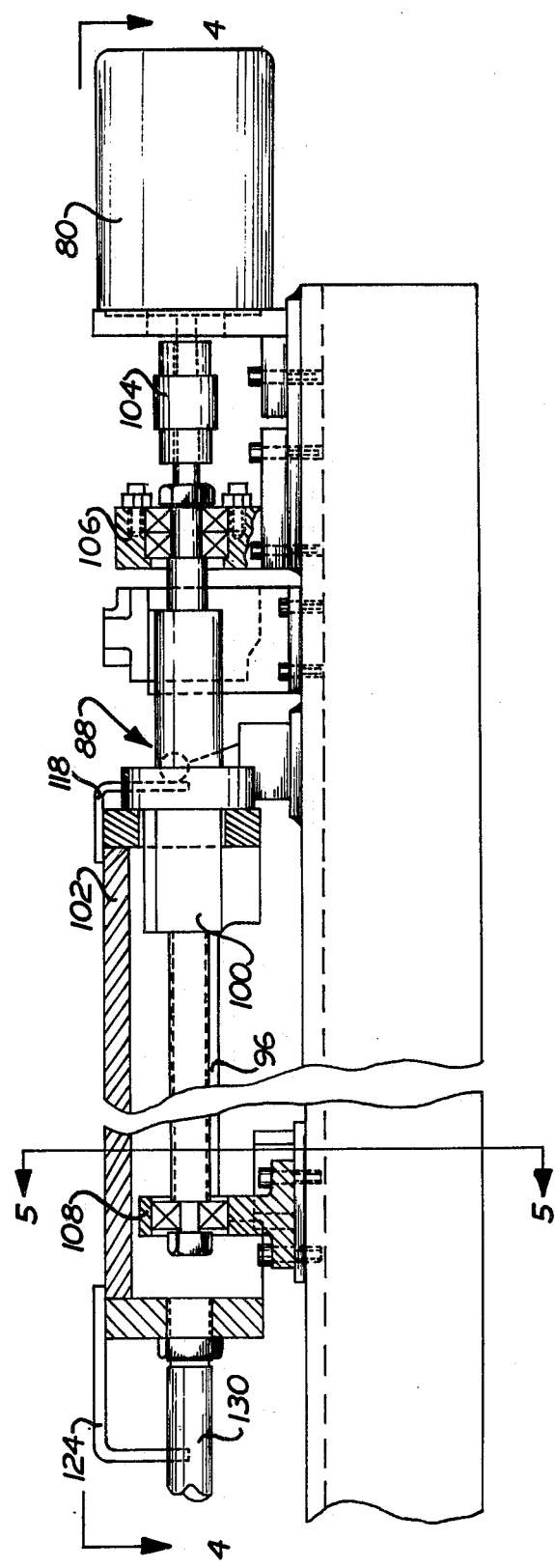
FIG. 3 is a fragmentary sectional view of an apparatus for driving one of the pumps which supplies fluid to an associated electrode drive ram.
Figure 5:
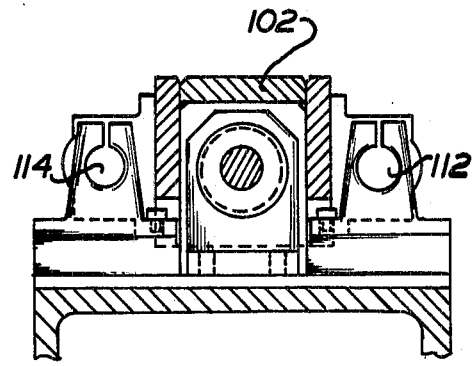
FIG. 5 is an elevational view, taken generally along the line 5—5 of FIG. 3, illustrating the manner in which a drive screw and carriage are supported.
Figure 7:
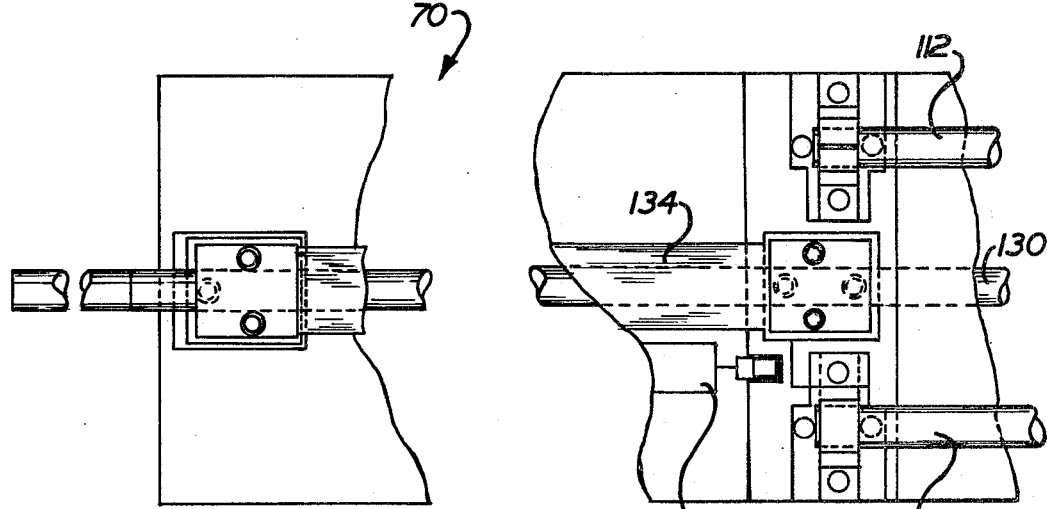
FIG. 7 is a plan view, taken generally along the line 7—7 of FIG. 6, further illustrating the construction of the pump.

The construction of the screw and nut drive arrangement 88 is illustrated in FIGS. 3 and 4. The screw or worm 96 of the screw and nut drive arrangement 88 is connected with a recirculating ball type nut 100 (see FIG. 3) which is connected with a carriage 102. Upon operation of the variable speed motor 80, a coupling assembly 104 rotates the screw 96 which is rotatably supported and held against axial movement by suitable bearing mountings 106 and 108. Since the ball nut 100 is fixedly connected with the carriage 102, upon rotation of the screw 96 the ball nut and carriage are moved axially relative to the screw 96. The outer (as viewed in FIGS. 4 and 5) end portion of the carriage 102 is supported by a pair of parallel guide bars 112 and 114. It should be noted that a striker or actuator lever 118 is provided to actuate a limit switch 120 when the carriage 102 is in a rightward (as viewed in FIGS. 3 and 4) position. Similarly a striker or actuator lever 124 is provided to actuate a limit switch 126 (see FIG. 7) when the carriage 102 is at a leftward (as viewed in FIGS. 3 and 4) position. It should be understood that although the screw and nut drive arrangement 88 is preferred, other drive arrangements may be utilized if desired.

Figure 6:
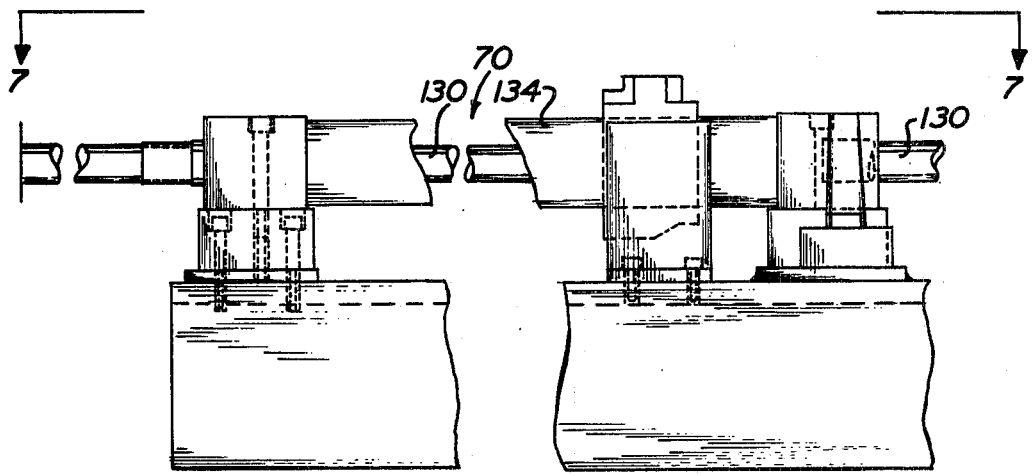
FIG. 6 is a side elevational view of a pump driven by the drive apparatus of FIGS. 3-5 and utilized to supply fluid to an electrode drive ram.

The pump 70 is of the well known piston and cylinder type (see FIGS. 6 and 7) and has a piston rod 130 which is connected with the leftward (as viewed in FIGS. 3 and 4) end portion of the carriage 102. The piston rod 130 is connected with a piston 132 in the manner illustrated schematically in FIG. 2. The piston 132 cooperates with a cylinder 134 to divide the cylinder into a pair of variable volume chambers. The piston rod 130 extends through the cylinder 134 so that upon reciprocation of the piston rod through a pumping stroke toward either the left or the right the same volume of fluid is expelled from the pump 70.

Figure 2:
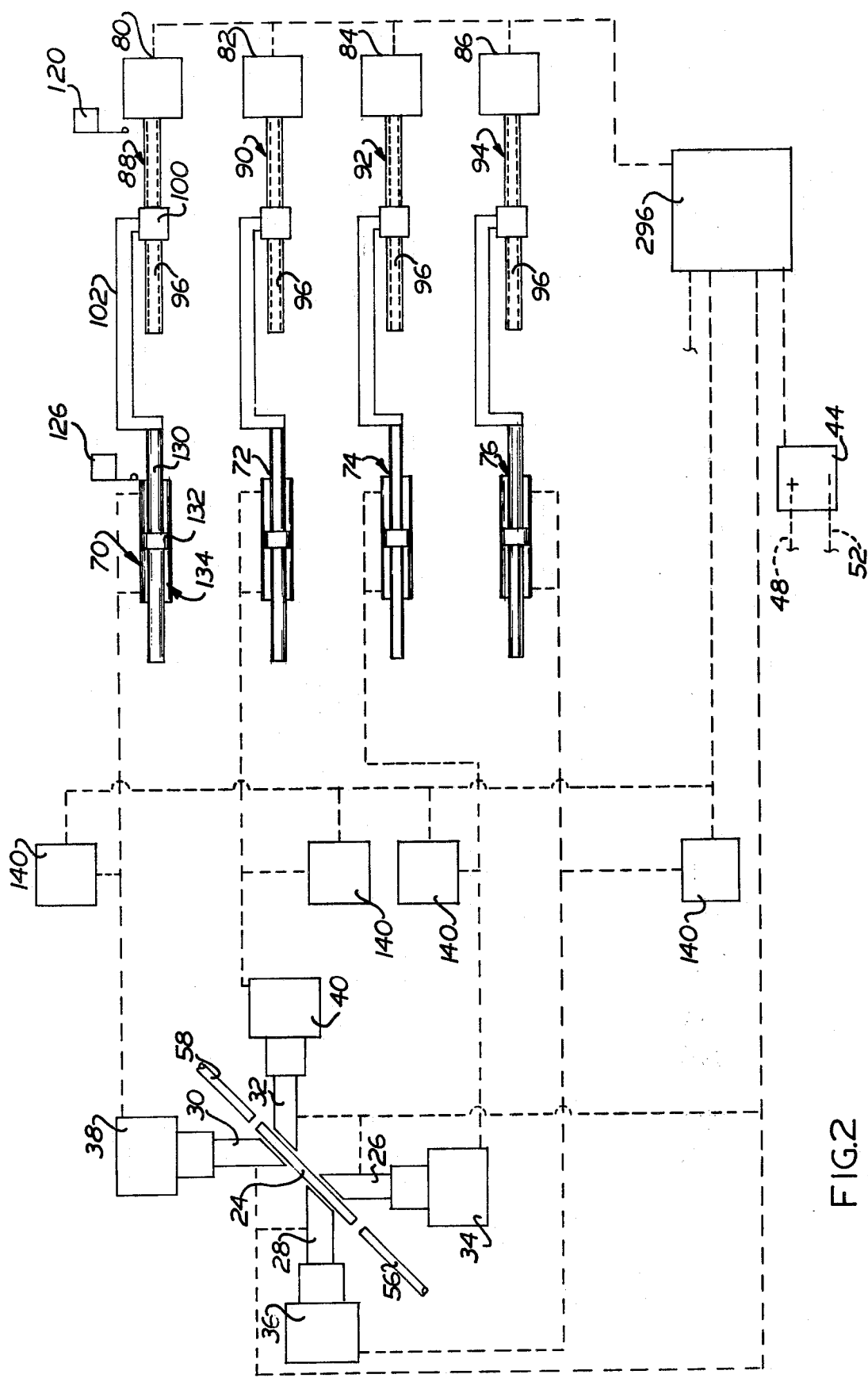
FIG. 2 is a schematic illustration depicting the relationship between a plurality of drive rams utilized to move electrodes relative to a workpiece, pumps for supplying the electrode drive rams with fluid, and an apparatus for controlling the operation of the pumps.

Upon each operating stroke of the pump 70, a relatively small volume of fluid is discharged from the pump to the ram cylinder 38 (see FIG. 2). Therefore, the relatively small diameter piston 132 must be moved through more than one pumping stroke in order to pump sufficient fluid to the ram cylinder 38 to effect movement of the associated relatively large diameter electrode ram through a working stroke. Since the volume of fluid expelled from the pump 70 during each pumping stroke of the piston 132 is relatively small compared to the total volume of fluid required by the ram 38 to effect movement of the electrode 30 through a working stroke, any errors in the ball and screw arrangement 88 tend to be minimized. In addition, the relatively short axial length of the screw 96 tends to eliminate errors due to thermal expansion and other factors associated with relatively long drive screws and makes the drive arrangement relatively compact with a resulting saving in floor space required by the machine 20. In addition to being less expensive to fabricate, the short screw 96 has a relatively small length to diameter ratio so that intermediate support bearings are not required to withstand buckling forces.

To effect movement of the piston 132 through a plurality of operating strokes, the direction of operation of the motor 80 is reversed each time the piston reaches the end of an operating or pumping stroke. Thus, whenever a screw 96 has been rotated in one direction by the motor 80 for an extent sufficient to cause the nut 100 to move leftwardly to an end of stroke position of the piston 132, the striker arm or lever 124 on the carriage 102 (see FIGS. 3 and 4) engages the limit switch 126 (FIG. 7) to effect a reversal in the direction of operation of the motor 80. Upon a reversal in the direction of the motor 80, the nut 100 is moved back in the opposite direction, that is toward the right as viewed in FIGS. 2 and 3, until the actuator or striker plate 118 (see FIG. 4) engages the limit switch 120. Actuation of the limit switch 120 causes a second reversal in the direction of operation of the motor 80 to again effect movement of the piston 132 through a leftward (as viewed in FIG. 2) pumping stroke.

Although the motor 80 can be operated at a relatively high speed, the pump 70, due to its relatively small operating capacity, may be ineffective to discharge fluid at a rate sufficient to cause the ram 38 to move the electrode 30 at a desired speed as the electrode is moved from a fully retracted position to a beginning of work stroke position. A high speed or slewing control arrangement 140 (FIG. 2) is connected with the ram 38 to effect high speed movement of the ram to a beginning of stroke position without operating the motor 80, screw and nut drive arrangement 88 and pump 70 at relatively high speeds. It should be noted that during high speed movement of the electrode 30 from the fully retracted position to the beginning of work stroke position, the electrode 30 and the workpiece 24 are at the same electrical potential and electrolyte is excluded from the operating chamber in which the workpiece 24 is disposed to avoid impact with the fast moving electrode. Therefore, there is no electrolytic removal of material from the workpiece during high speed portion of the stroke.

Figure 8:
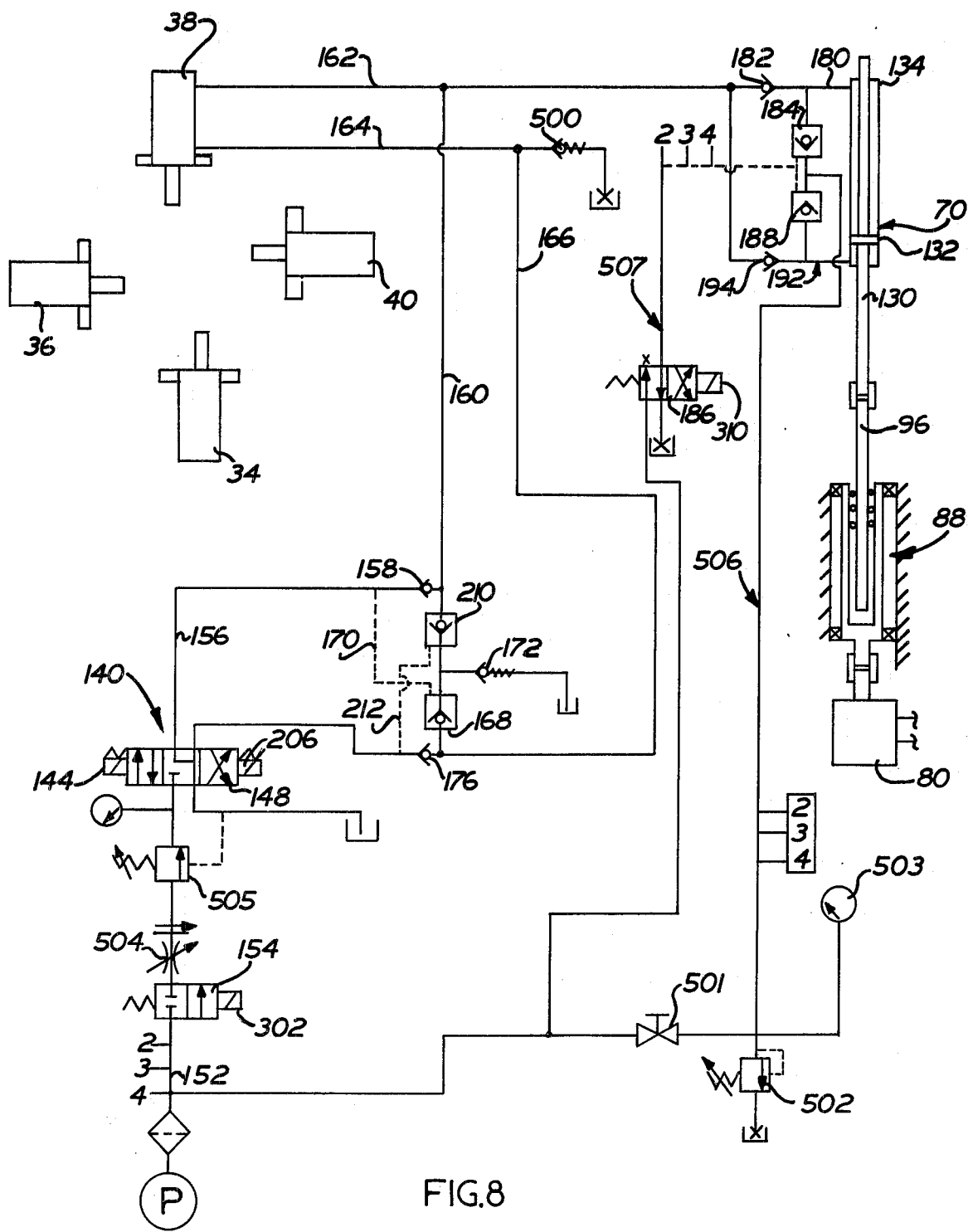
FIG. 8 is a schematic illustration depicting the relationship between one of the electrode drive rams, a pump for supplying fluid to the drive ram, a drive assembly for effecting operation of the pump, and controls for effecting high speed or slowing movement of the ram.

The manner in which the slewing control apparatus 140 is hydraulically connected with the ram 38 is illustrated in FIG. 8. To effect movement of the ram 38 at a relatively high speed to move the electrode 30 from a fully retracted position to a beginning of work stroke position, solenoids 144 and 302 are actuated, actuating the solenoid 144 moves a slewing control valve 148 rightwardly, as viewed in FIG. 8, to an actuated position in which high pressure from a supply conduit 152 is ported through a now open start valve 154 to a conduit 156. This high pressure fluid flows through a check valve 158 to a conduit 160 which is connected with the head end of the ram 38 by a conduit 162. Flow rate and fluid pressure are controlled by 504 and 505 respectively.

As the ram 38 is extended and the electrode 30 moved at a relatively high speed toward its beginning of work stroke position, fluid is exhausted from the rod end of the ram 38 to a conduit 164 which is connected with the conduit 166 and a pressure actuated check valve 168. At this time, the check valve 168 is actuated to an open condition under the influence of fluid pressure conducted through a conduit 170 from the conduit 156. The fluid exhausted from the ram 38 flows to drain through a pressure relief valve 172 which maintains a predetermined minimum pressure in the conduit 164 and 166 and the rod end portion of the ram 38.

When the electrode 30 has moved to a beginning of stroke position, solenoids 144 and 302 are deenergized. The slewing control valve 148 returns to the neutral, or initial position illustrated in FIG. 8, and valve 154 closes. At this time, the conduit 156 is connected to the drain through the solenoid control valve 148 so that the pressure actuated check valve 168 is no longer open and blocks fluid flow from the rod end of the ram 38 to drain through the pressure relief valve 172. It should be noted that a check valve 176 blocks fluid flow from the rod end of the ram 38 to the slewing control valve 148 and that the check valve 158 blocks fluid flow from the head end portion of the ram 38 and conduit 160. Check valves 182 and 194 protect the pump 70 during slew.

After all of the electrodes 26–32 (see FIG. 2) have been moved to their beginning of work stroke positions and their associated slewing controls 140 (FIG. 2) returned to neutral, the motor 80 (FIG. 8) is energized to effect operation of the screw and nut drive arrangement 88 to actuate the pump 70. At this time, the piston 132 is at an end of stroke position and the motor 80 is energized to cause the piston to move toward the opposite end of the cylinder 134. As this occurs, fluid under pressure is discharged from the cylinder 134 to a conduit 180 (FIG. 8) and through a check valve 182 to the conduit 162 leading to the head end of the ram 38. Fluid is forced out the rod end of ram 38 through conduit 164 and pressure relief valve 500 to tank.

The relatively high fluid pressure in the conduit 180 is transmitted to a check valve 184 to maintain this check valve in a closed condition. However, makeup fluid supplied through conduit 506 from flow control valve 501 with a pressure controlled by valve 502 through check valve 188 to a conduit 192 and into the end of the cylinder 134. It should be noted that at this time the fluid pressure in the conduit 162 is sufficient to maintain a check valve 194 closed.

When the ball and screw drive arrangement is fully extended and the piston 132 reaches an end of stroke position, the actuator lever 124 actuates the limit switch 126 (see FIG. 7) to cause the direction of operation of drive motor 80 to be reversed. High pressure fluid is then discharged from the pump 70 through the conduit 192 and through the check valve 194 to the conduit 162 and the head end of the ram 38. At this time the relatively high fluid pressure in the conduit 192 holds the check valve 188 closed and makeup fluid is ported through check valve 184 to the conduit 180 and the end of the motor cylinder 134. The fluid pressure in the conduit 180 is insufficient to cause the check valve 182 to open against the influence of the relatively high fluid pressure in the conduit 162.

When the pump 70 has been operated through enough pumping strokes to cause the ram 38 to move the electrode 30 to a position where electrode synchronization is desired, movement of the electrode 30 is interrupted. To effect the interruption of the movement of the electrode 30 at a predetermined intermediate position, a control valve 186 is actuated by solenoid 310 from the closed position illustrated in FIG. 8 to an open position which pressurizes conduit 507 and opens pressure actuated check valves 184 and 188 to short circuit opposite ends of the pump 70. The motor 80 is then energized for a sufficient length of time to cause the piston 132 to be returned to its beginning of stroke position illustrated in FIG. 8. When this occurs, the limit switch 120 is actuated and the motor 80 is deenergized.

The position or positions at which electrode synchronization is desired during a working stroke will vary as a function of the initial or starting geometry of the workpiece, the depth of electrode penetration into the workpiece to form the product, and the dimensional tolerance requirements of the product. The machine 20 is described herein as being utilized to form a workpiece where electrode synchronization is desired just short of the end of working stroke position of the electrode. However, it is contemplated that electrode synchronization will not be limited to any one position or positions.

When all of the electrodes 26–32 have moved to intermediate positions at which electrode synchronization is desired and the associated pumps 70–76 returned to beginning of pumping stroke position, the control valve 186 (FIG. 8) is returned to the closed position, pressure is relieved from actuation ports of check valves 184 and 188 and operation of the motor 80 is resumed. As the motor 80 is operated, the piston 132 is moved to discharge fluid under pressure to the head end of the ram 38. When products having dimensional tolerances of approximately plus or minus one thousandth of an inch are being formed, the volume of fluid required to cause the ram 38 to move the electrode 30 from its last intermediate position to its end of work stroke position is less than the volume of fluid discharged from the pump 70 during a single pumping stroke of the piston 132. Therefore as the electrode 30 moves from its last intermediate position to an end of work stroke position, the direction of operation of the motor 80 and rotation of the screw 96 is not reversed. This eliminates the introduction of even very minute errors in the movements of the electrode 30 during the final portion of its working stroke to provide for an unusually accurately formed article.

It should be noted that all four electrodes 26, 28, 30 and 32 are moved to their intermediate positions before any one of the electrodes leaves its intermediate position and that all four electrodes simultaneously leave their intermediate positions and move toward their end of work stroke positions so that each of the electrodes completes its work stroke at the same time. If the electrodes 26, 28, 30 and 32 were to complete their work strokes at different times, the resulting imbalance of operating forces on the workpiece 24 could introduce errors into the manner in which the workpiece is formed.

Upon completion of a working stroke of the electrode 30, solenoids 206 and 302 are energized to effect movement of the slewing control valve 148 toward the left (as viewed in FIG. 8) and to open supply valve 154. This ports relatively high pressure oil from the supply conduit 154 through the open control valve 154 and check valve 176 to the line 166 and to the conduit 164 connected with the rod end of the ram 38. This causes the ram 38 to be quickly retracted.

As the ram 38 is retracted, fluid is discharged from the head of the end of the ram through the conduits 162 and 160 to a pressure actuated check valve 210. The pressure actuated check valve 210 is opened by high pressure fluid conducted through a conduit 212 to enable the head end of the ram 38 to be exhausted to drain through the pressure relief valve 172. When the electrode 30 reaches its fully retracted position, solenoids 206 and 302 are deenergized and the slewing control valve 148 and on/off valve 154 return to their neutral or closed position illustrated in FIG. 8.

While the electrode is returning to its retracted position, valve 186 is opened by operating solenoid 310 to allow fluid to pass from one side of piston 132 to the other, and motor 80 is operated to drive screw 88 so as to return shaft 130 to its start position. Although only the operation of the hydraulic controls, pump 70 and motor 80 connected with the ram 38 for the electrode 30 have been described extensively herein, it should be understood that similar apparatus is provided to effect operation of the rams 34, 36 and 40 to move the electrodes 26, 28 and 32 through working and return strokes simultaneously with movement of the electrode 30 through working and return strokes. Connections 2, 3, 4 shown on FIG. 8 show how the hydraulic supply is ported to rams 34, 36 and 40.

Each time the piston and cylinder type pump 70 is operated to an end of stroke condition, the direction of operation of the motor 80 must be reversed. This is accomplished by control circuitry 220 which is illustrated schematically in FIG. 9. The control circuitry 220 includes a flip-flop 222 which is connected with a motor controller 224. Upon operation of the pump 70 to an end of rightward pumping stroke (as viewed in FIGS. 2 and 4), a limit switch 120 is actuated. Actuation of the limit switch 120 pulses a set terminal 228 of the flip-flop 222. This causes a signal to be transmitted over the lead 230 to the motor controller 224 to effect a reversal in the direction of operation of the motor 80.

When the pump 70 reaches the end of a leftward pumping stroke (as viewed in FIGS. 2 and 4) the limit switch 126 is actuated to pulse a reset terminal 234 (FIG. 9) of the flip-flop 222. This causes a signal to be transmitted over a lead 236 to the motor controller 224 to again reverse the direction of operation of the motor 80. Each time the direction of operation of the motor 80 is reversed the direction of rotation of the screw 96 in the drive assembly 88 (see FIGS. 2 and 3) is reversed with a resulting reversal in the direction the carriage 102 is moved by the nut 100. Of course, reversing the direction of movement of the carriage 102 reverses the direction of movement of the piston rod 130 and piston 132.

Figure 9:
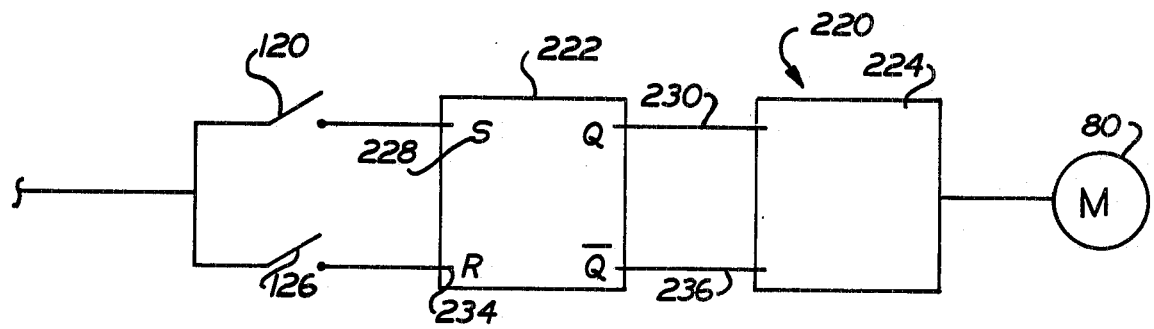
FIG. 9 is a simplified schematic illustration of control circuitry for effecting a reversal in the direction of operation of a pump drive motor in response to operation of a pump to an end of pumping stroke position.

Although only the control circuit 220 for the motor 80 has been illustrated schematically in FIG. 9, it should be understood that similar control circuits are associated with the motors 82, 84 and 86. It should also be understood that it is contemplated that other types of control circuits could be utilized to effect a reversal in the direction of operation of the motor 80 each time the associated pump completes a pumping stroke.

During an operating cycle of the machine 20, movement of the electrode 30 can be interrupted at three or more different positions, that is at the beginning of work stroke position, at selected intermediate positions, and an end of work stroke position. Each time the electrode 30 is moved to one of these positions, it stops until the other electrodes 26, 28 and 32 reach corresponding positions. After all four electrodes have arrived at corresponding predetermined positions, the operating cycle of the machine is resumed with all four of the electrodes in phase. A control circuit 240 for controlling the movement of the electrode 30 in conjunction with the electrodes 26, 28 and 32 is illustrated schematically in FIG. 10.

The control circuit 240 includes a photoelectric detector assembly 244 which is effective to detect when an associated electrode, in this case the electrode 30, has been moved to a predetermined position. When the electrode 30 has been moved at a relatively high speed to the beginning of work stroke position, a signal is provided over a lead 246 to a lead 248 connected to suitable controls to effect deenergization of the slewing valve solenoid 144 (see FIG. 8). Upon deenergization of the solenoid 144, the valve 148 returns to its closed position to interrupt the high speed movement of the electrode 30.

The control circuitry 296 prevents any one of the electrodes 26, 28, 30 or 32 from moving from its beginning of work stroke position until all of the electrodes have moved to their beginning of work stroke positions. To this end, an input signal is provided on a lead 250 (FIG. 10) leading to an "and gate" 252. Therefore, when the output signal is provided on the lead 246 from the detector 244, the "and gate" 252 provides an output to a set terminal 254 of a flip-flop 256. This causes an output signal to be transmitted over a lead 258 to an "and gate" 260. To prevent movement of the electrode 30 from its beginning of work stroke position until the other electrodes 26, 28 and 32 have arrived at their beginning of work stroke positions, the output signal from the flip-flop 256 is transmitted over a lead 262 to an "or gate" 264. The resulting output signal from the "or gate" 264 is transmitted over a lead 266 to effect actuation of a solenoid 310 and operation of valve 186 which opens pilot operated check valves 184 and 188 (see FIG. 8) by which the opposite ends of the pump cylinder 134 connected in fluid communication to thereby short circuit the output of the pump 70.

When the electrodes 26, 28 and 32 have been moved to their beginning of work stroke positions, signals are provided over leads 274, 276 and 278 which are connected with photoelectric detectors and control circuitry associated with the rams 34, 36 and 40 in the same manner in which the detector 244 and control circuitry 296 is associated with the ram 38. When all four electrodes 26, 28, 30 and 32 have reached the beginning of work stroke position, the "and gate" 260 provides an output signal to a lead 280 which is connected with the reset terminal of the flip-flop 256 and similar flip-flops in circuits associated with the other electrodes. Resetting the flip-flop 256 interrupts the output signal over the lead 258 to the "and gate" 260. Interrupting this output signal also interrupts the input to the "or gate" 264 so that the solenoid 310 is deenergized and the control valve 186 and valves 184 and 188 returned to their closed positions blocking fluid flow between opposite ends of the motor cylinder 134. Operation of the motor 80 is then effective to cause the pump 70 to initiate movement of the electrode 30 toward its end of work stroke position.

To provide for time in which to move the electrode 30 away from its beginning of stroke position, a time delay circuit 284 interrupts the output signal on the lead 250 for a predetermined, relatively short, period of time. This results in a disabling of the "and gate" 252. After the electrode 30 is moved away from its beginning of stroke position, the timer 284 times out and a signal is again provided over the lead 250 to the "and gate" 252. However, at this time, the detector 244 does not provide an output signal to the "and gate" 252.

When the electrode 30 reaches its intermediate position, the detector 244 again provides an output signal to the "and gate" 252. This causes the flip-flop 256 to again be set and provide an output signal to the "and gate" 260. The output signal from the flip-flop 256 is transmitted to the or gate 264 to effect energization of the solenoid 310 and operation of the valves 184, 186 and 188 (see FIG. 8) to the open condition short circuiting the pump 70.

When all four electrodes 26, 28, 30 and 32 have moved to their intermediate positions, signals are provided on all four of the leads to the "and gate" 260 with a resulting output signal to the reset terminal of the flip-flop 256. This effects a deenergization of the solenoid 310 so that the pump 70 is no longer short circuited. It should be noted that the output from the "and gate" 260 is transmitted to control circuits associated with each one of the electrodes 26, 28, 30 and 32 so that all four electrodes simultaneously start to move from their intermediate positions toward their end of stroke positions.

When the electrode 30 has moved to its end of stroke position, the detector 244 again provides an output signal to the "and gate" 252 to set the flip-flop 256 and provide a signal to the "or gate" 264 to energize the solenoid 310. This disables the pump 70 to stop movement of the electrode 30 at its end of working stroke position. When all four electrodes 26, 28, 30 and 32 reach their end of working stroke positions, the slewing controls are again actuated to effect high speed movement of the electrode back to their retracted positions.

In order to prevent the initiation of operation of the pump 70 after all four electrodes have been moved to their end of stroke positions, a register 288 is effective to provide an output signal after three input signals have been provided to the register. This output signal is transmitted to the "or gate" 264 and maintains the solenoid 310 energized so that the control valve 186 and pilot valves 184 and 188 remains actuated and pump 70 short circuited. The output signal is also sent to the control logic to turn off electrolyte, electrode potential and cause all electrodes to slew back to their original home position.

Although it is contemplated that the electrodes 26, 28, 30 and 32 could be moved to any one of a plurality of intermediate positions, in the present instance each of the electrodes is moved to a single intermediate position which is disposed a short distance from the end of stroke position. Therefore, the register 288 is set to provide an output signal to the "or gate" 264 after three output signals have been provided from the "and gate" 260. The first of these output signals being the output signal which occurs when the electrode 30 is moved to its beginning of stroke position, the second being when the electrode 30 is moved to its intermediate position and the third being when the electrode 30 is moved to its end of stroke position. If it is desired to have the electrodes 26, 28, 30 and 32 stop at additional intermediate positions to coordinate the movement of the electrodes during relatively long working strokes, it is merely necessary to provide additional ram travel position marks to activate the detectors 244 and to set the registers 288 to provide an output after counting more than three pulses. After all four electrodes 26, 28, 30 and 32 have been operated to their end of stroke positions and subsequently retracted, a signal is provided over a lead 292 to reset the counter 288.

Figure 10:
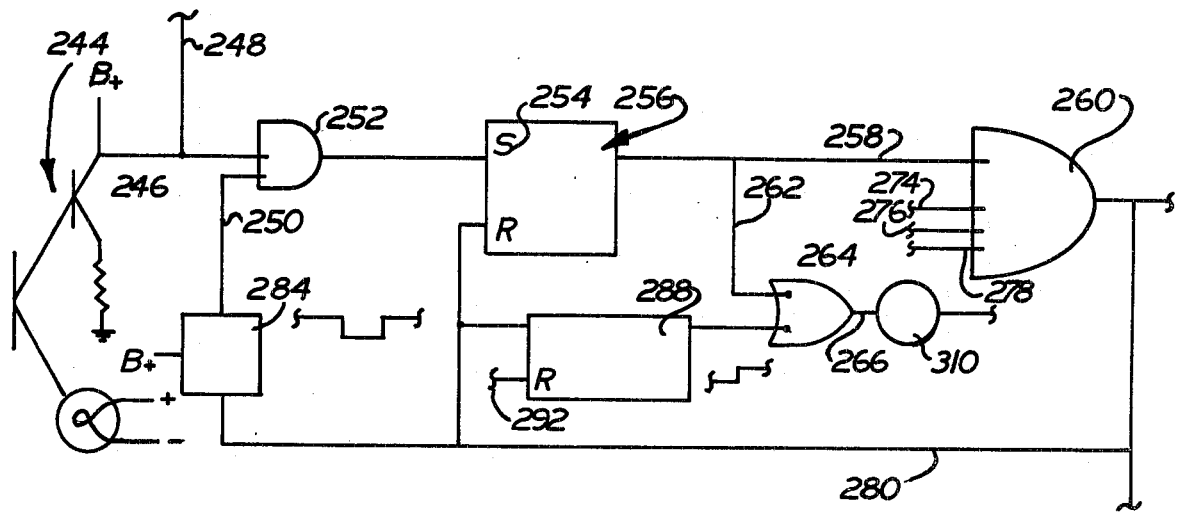
FIG. 10 is a simplified schematic illustration of control apparatus for regulating the operation of the electrode drive rams.

It should be understood that the controls illustrated in FIGS. 9 and 10 are merely schematic representations of examplary controls and that relatively sophisticated known control circuitry will be utilized in the machine 20. In one specific preferred embodiment of the invention, an Allen Bradley 1750 programmable matrix controller 296 (see FIG. 11) was utilized to control the operation of the machine 20. The programmable matrix controller 296 is connected with hydraulic controls, similar to the hydraulic controls of FIG. 8, for each of the electrodes 26, 28, 30 and 32.

When an operating cycle of the machine 20 is to be initiated, the ram 38 is fully retracted and a limit switch 300 (see FIG. 11) is closed. An operating cycle is initiated by manually actuating a start switch (not shown). The controller 296 energizes a solenoid 302 (FIG. 11) to effect actuation of the control valve 154 (FIG. 8) to an open condition. Opening the control valve 154 ports high pressure fluid to the slewing control valve 148. The controller 296 then effects energization of the solenoid 144 to actuate the slewing control valve 148 to an open condition porting high pressure fluid to the head end of the ram 38. This causes the ram 38 to move the electrode 30 toward a beginning of work stroke position at a relatively high speed.

When the electrode 30 reaches a beginning of working stroke position, the photoelectric detector 342 provides an input signal thru its signal conditioner 542 to the controller 296 which responds by effecting deenergization of the solenoid 144. The slewing control valve 148 is returned to the neutral position illustrated in FIG. 8. The solenoid 302 is also deenergized so that the valve 154 closes. A safety switch 306 is actuated if the detector 244 fails to provide a signal indicating that the electrode 30 has moved to an end of slewing stroke and beginning work stroke position. The limit switch 306 is porvided as a safety factor and, during normal operating conditions, does not effect the operation of the machine.

When all four of the electrodes 26, 28, 30 and 32 (FIG. 2) have been moved to their beginning of work stroke positions, the controller 296 implements a number of previously programmed operating instructions. Among action initiated by the controller 296 at this time is redirecting of electrolyte from a by-pass readiness position to the operating chamber in which the workpiece 24 is disposed, checking the electrolyte flow pressure, switching the electrical power for the electrodes from a standby condition to the main bus bars 52 and cables 48, and checking the electrode voltage. The controller 296 then initiates a machine cycle by deenergizing the solenoid 310 which closes control valve 186 to effect a closing of the short circuiting valves 184 and 188. Contemporaneously therewith the motors 80, 82, 84 and 86 are activated to cause the pumps 70, 72, 74 and 76 to be operated to direct high pressure fluid to the associated rams 34, 36, 38 and 40. As the pumps are operated, they move to an end of pumping stroke position in which a limit switch, corresponding to limit switch 126, is closed. This causes the controller 296 to reverse the direction of operation of the associated one of the pump motors 80, 82, 84 or 86.

The pumps are operated through a plurality of pumping strokes to effect operation of the associated rams 34, 36, 38 and 40 to an extent sufficient to move the electrodes 26, 28, 30 and 32 to intermediate positions spaced a short distance from their end of stroke positions. As electrodes 26, 28, 30 and 32 reach their intermediate position, the controller 296 effects actuation of a valve 186 (FIG. 8), to short circuit the associated pumps 70, 72, 74 or 76 through the pressure actuated check valves corresponding to 184 and 188. Thus, when the electrode 30 has moved to its intermediate position, the controller 296 effects energization of the solenoid 310 to render the pumps 70 ineffective to direct fluid under pressure to the associated ram 38.

After each electrode 26, 28, 30 and 32 has been moved to its intermediate position and the associated pump short circuited, the associated drive motor remains energized to effect operation of the pump to its beginning of pumping stroke condition. Thus, after the solenoid 310 has been energized to open the control valve 186 and thereby the check valves 184 and 188, the motor 80 is then operated until the pump 70 is returned to a beginning of stroke position and the limit switch 120 is actuated. The motor 80 is then deenergized with the electrode at an intermediate position between its beginning and end of stroke positions and with the pump 70 at its beginning of pumping stroke position.

During movement of each of the electrodes 26, 28, 30 and 32 through a working stroke, an electrical potential is established between the electrodes and the workpiece 24 by the rectifier 44 (FIG. 2) under the influence of the controller 296. When movement of an electrode is interrupted at an end of stroke position, the controller 296 effects operation of the rectifier controls to eliminate the electrical potential between the stationary electrode and the workpiece. At intermediate positions the electrical potential between the workpiece and electrodes is interrupted by the use of a high amperage SCR placed in each electrode circuit. This enables the electrical potential in a leading electrode to be interrupted when it reaches an intermediate position while the trailing electrode circuits are maintained. If the electrical potential was maintained between a stationary electrode and the workpiece, chewing of the workpiece could result, that is intergranular and low current density attack of the workpiece would take place in a known manner. Accordingly, in order to prevent this chewing from occurring the electrical potential between the workpiece and the stationary electrode is preferrably discontinued upon interruption of movement of the electrode. However, the flow of electrolyte between the electrodes and workpiece is usually maintained.

When all of the electrodes 26, 28, 30 and 32 have been moved to their intermediate positions and all of the pumps 70, 72, 74 and 76 have been operated to a beginning of pumping stroke position, the controller 296 effects operation of rectifier controls to reestablish the electrical potential between the electrodes and the workpiece. At this time the valves for short circuiting the various pumps, that is the valves corresponding to the valve 186 of FIG. 8, is closed thereby closing valves 184 and 188. The various pump drive motors 80, 82, 84 and 86 are energized to effect simultaneous operation of the pumps 70, 72, 74 and 76 through a portion of a pumping stroke. Before the pumps reach the end of a pumping stroke, that is before the limit switches corresponding to the limit switch 126 are actuated, the electrodes 26, 28, 30 and 32 are moved to their end of stroke positions.

Upon movement of the electrodes 26, 28, 30 and 32 to their end of stroke positions, the detectors 244 provide signals to the controller 296 which effects operation of the short circuiting valves 184 and 188 by opening valve 186 of FIG. 8, to render the pumps 70, 72, 74 and 76 ineffective to drive the associated rams 34, 36, 38 and 40. In addition, the electrical potential between the various electrodes and the workpiece is eliminated when the electrodes reach their end of working stroke position.

The electrodes 26, 28, 30 and 32 will reach their end of stroke positions at almost exactly the same time since the electrodes all start at the same time from intermediate positions which are just short of the end of stroke positions. The elimination of any errors in movement of electrodes through the short distance remaining in their working strokes is promoted by the fact that the direction of operation of the various drive assemblies 88, 90, 92 and 94 and pumps 70, 72, 74 and 76 is not reversed as the electrodes are moved from their intermediate positions to their end of stroke positions. In addition, the previous operation of the various hydraulic systems has compressed any air entrained in the hydraulic liquid in the electrode drive rams 34, 36, 38 and 40 and maintains it at a constant volume by controlling pressure at valve 500, FIG. 8. This eliminates any small amount of hydraulic elasticity which may be incorporated in the systems. Since the electrodes 26, 28, 30 and 32 all reach their end of stroke positions at the same time, operating forces on the workpiece 24 remain substantially constant until the workpiece 24 has been shaped to its desired configuration. Of course, this promotes the accurate shaping of the workpiece.

When the electrodes 26, 28, 30 and 32 have all reached their end of stroke positions and the short circuiting valves 184 and 188 associated with the pumps 70, 72, 74 and 76 have been opened, the motors 80, 82, 84 and 86 are again operated to return the pumps to their beginning of stroke positions. After this has occurred, the pumps 70, 72, 74 and 76 are in condition to begin a next succeeding operating cycle of the machine 20.

The rams 34, 36, 38 and 40 are simultaneously returned to their retracted positions. This is accomplished by actuating the slewing control valves to port high pressure fluid to the rod ends of the rams. Thus, solenoids 206 and 302 are energized to actuate the slewing control valve 148 and the on/off valve 154 to port high pressure fluid to the rod end of the ram 38. When the rams reach their fully retracted position, switches, corresponding to the switch 300 of FIG. 11, are actuated and the controller 296 deenergizes the slewing control valve solenoids, corresponding to the solenoids 206 and 302 to return the slewing control valve 148 to its neutral position and the on/off valve 154 to its off position. Simultaneous with slewing of rams 34, 36, 38 and 40 to the retracted positions, solenoid 310 is actuated to operate valve 186 which opens valves 184 and 188 connecting the two ends of cylinder 134 together. Motor 80 is then actuated by the controller 296 to return all pumps 70, 72, 74 and 76 to the original start position as defined by limit switch 120. Solenoid 310 is then deenergized.

Although only the control circuitry associated with the controller 296 to effect actuation of the hydraulic and electrical controls associated with the ram 38 has been illustrated in FIG. 11, it should be understood that the controller 296 is connected with similar hydraulic and electrical controls to effect operation of the rams 34, 36 and 40 in the same manner as in which the ram 38 is operated. It should be noted that a photoelectric detector 244 (see FIG. 1) is associated with each of the electrode rams 34, 36, 38 and 40 to provide accurate indications of the position of the associated electrode 26, 28, 30 or 32.

The construction of the photoelectric detector 244 is more fully illustrated in FIGS. 12 and 13. The detector 244 includes a stationary housing 318 which is fixedly mounted on the machine 20. A carriage 320 is moved relative to the housing 318 in synchronism with the associated electrode by a drive rod 322 connected with the rod of the associated electrode drive ram. Mounted on the carriage 320 is a code or indicator bar 326. The code bar 326 has a relatively shiny background which is highly reflective and which is indicated by the numeral 328 in FIG. 12. On the background 328 are a plurality of narrow dark code marks or lines of substantially lower reflectivity. Of course, the background 328 could be dark and the code marks shiny if desired.

A first code mark or line 330 indicates when the associated electrode drive ram 34, 36, 38 and 40 is in a fully retracted position. A second line 332 is utilized to indicate when the associated electrode drive ram is at a beginning of work stroke position. Another line 334 is utilized to indicate when the associated ram is at an intermediate position. Finally, a line 336 is utilized to indicate when the associated ram has moved to an end of working stroke position. Of course, if it is desired to have the electrodes 26, 28, 30 and 32 stop movement at and simultaneously move away from additional intermediate positions between the beginning and end of work stroke positions, additional code marks would be provided on the bar 326 between the beginning of work stroke mark 332 and end of work stroke mark 336. Each of the code lines or marks 330, 332, 334 and 336 is moved in succession into a target area, indicated generally at 340 in FIG. 12. Movement of each of the marks 330, 332, 334 and 336 in turn into a target area 340 is detected by a photoelectric scanner 342. Although many different types of photoelectric scanners 342 could be utilized, in one specific preferred embodiment of the invention a Skan-A-Matic series T330D scanner which is commercially available from the Skan-A-Matic Corporation of Rt. 5 West, Elbridge, New York 13060, U.S.A. was used.

The scanner 342 contains a light emitting diode 346 (see FIG. 11) which directs light to the target area 340 through light transmitting fibers in a bundle contained within a snout or tube 348 (see FIG. 12.). The light is reflected by the relatively shiny background area 328 through a second fiberoptic bundle which is coaxial with the first fiberoptic bundle. This reflected light is conducted back through the snout 348 to a photosensitive transistor 352 in the scanner 342. When a dark code mark or line 330, 332, 334 or 336 is moved into the target area 340 by movement of the associated electrode and ram, the resulting variation in the light reflecting characteristics of the target area is detected by the photosensitive transistor 352 which provides an output signal to the amplifier and change of state switch (on/off) and then to the controller 296.

A cam bar 346 is mounted on the carriage 320 for movement with the target or indicator bar 326. The cam bar 356 is utilized to actuate limit switches 300, 306, and 360. The limit switches 300, 306 and 360 are merely utilized as safety switches which provide signals to the controller 296 to disable the machine 20 in the event of a malfunctioning of the control apparatus. Thus, when the ram 38 is moved to the fully retracted position, the limit switch 300 is actuated by the cam 356. Similarly, when the ram has been moved to an end of slewing stroke position, a switch 306 is actuated. Finally, if the ram is moved past the end of working stroke position, a limit switch 360 is actuated.

It has been found that the use of a photoelectric scanner 342 in association with a target or code bar 326 having a background of one light reflecting characteristic and markings of another light reflecting characteristic provides an accurate correlation between the position of the associated electrode relative to the workpiece and the initiation of a control function. It should be noted that although in the illustrated embodiment of the invention the dark code markings on the target bar 326 are utilized to indicate when movement of an electrode is to be interrupted, markings could be provided on the target bar to indicate when other control functions are to be undertaken. For example, a marking could be provided on the code bar to indicate when a change is to be made in the electrical potential between the electrodes and the workpieces or when the rate of operation of a pump drive motor 80, 82, 84 or 86 is to be varied. By utilizing known control circuitry to keep track of the number of code marks which move through the target area during a working stroke, code marks could be utilized on the same bar 326 to initiate different control functions. However, in one specific embodiment of the invention it was preferred to utilize the intermediate electrode position code marks to effect the control functions of interrupting the movement of the electrodes at intermediate positions and to effect a reduction in the speed of movement of the electrodes and the electrical potential between the electrodes and the workpiece as the electrodes move from their intermediate positions to their end of stroke positions.

Although the code bar 326 is provided with only a single marking 334 for one intermediate position at which the associated electrode is to be stopped, it is contemplated that a plurality of markings corresponding to a plurality of intermediate positions could be provided on the code bar if desired. For example, during the machining of an airfoil from a generally rectangular piece of stock, it was found to be desirable to stop the movement of the electrodes at a plurality of different intermediate positions. Therefore code markings corresponding to a plurality of intermediate positions were provided on the code bars 326 between the beginning of work stroke marking 332 and the end of work stroke marking 336. It should be noted that in this specific instance, the beginning and end of work stroke markings 332 and 336 were somewhat farther apart than shown in FIG. 12.

To provide for rapid movement of the electrodes through the initial portions of their work strokes, the pump drive motors 80, 82, 84 and 86 are operated at a relatively high speed to quickly move the electrodes to a first one of the plurality of intermediate positions. When the scanners 342 detect that the electrodes 26, 28, 30 and 32 have moved to their first intermediate position, operation of the pump drive motors 80, 82, 84 and 86 are interrupted as the associated electrodes 26, 28, 30 and 32 arrive at their first intermediate position. When all of the electrodes have arrived at their first intermediate position, the controller 296 initiates simultaneous movement of all of the electrodes 26, 28, 30 and 32 away from their first intermediate positions toward second intermediate positions at a speed which is somewhat different than the speed at which the electrodes had moved to their first intermediate positions. After the electrodes 26, 28, 30 and 32 have been moved through a plurality of intermediate positions to a final intermediate position immediately before the end of working stroke, the electrodes are simultaneously moved at a relatively slow speed from the final intermediate position to their end of working stroke positions to provide for the accurate formation of the workpiece.

It is contemplated that the electrical potential between the workpiece 24 and the electrodes 26, 28, 30 and 32 may advantageously be varied each time the speed of movement of the electrodes relative to the workpiece 24 is varied. Of course, varying the speed of movement of the electrodes and the electrical potential between the workpiece and the electrodes results in a change in the rate at which material is electrolytically removed from the workpiece. This provides a relatively large degree of operating flexibility to enable the machine 20 to be utilized to form many different types of articles.

In another embodiment of the invention a cam drive arrangement 370 (FIG. 14) was utilized in association with the photoelectric detectors 244. The cam drive arrangement 370 effects operation of control circuitry 374 (see FIG. 15) to vary the rate which electrodes are moved relative to the workpiece during a work stroke and to effect operation of control circuitry 376 (FIG. 16) to effect variations in the electrical potential between the workpiece and the various electrodes during a work stroke. In this embodiment of the invention the cam drive arrangement 370 is driven in synchronism with the pumps 70, 72, 74 and 76 which supply fluid to the rams 34, 36, 38 and 40.

Figure 14:
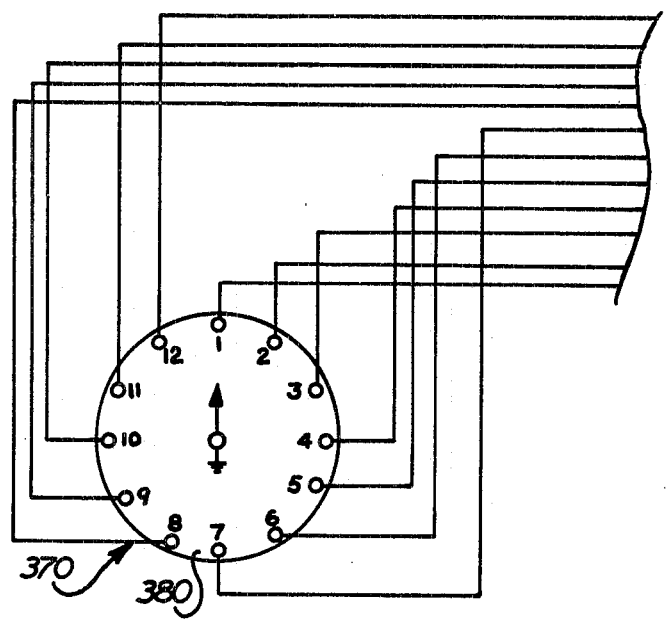
FIG. 14 is a schematic illustration of a cam drive apparatus which is, in one embodiment of the invention, utilized to provide a variety of output signals which vary as a function of electrode movement.

The cam drive arrangement is driven at a speed such that each cycle of operation of the machine 20 is divided into a plurality of segments, indicated by indicia on a dial 380 in FIG. 14. During each segment of the machine operating cycle, the circuits 374 and 376 are set to provide for a desired speed of electrode movement and electrical potential between the electrodes and the workpiece. Since the cam drive arrangement 370 is actuated in synchronism with the pumps which supply fluid to the rams 34, 36, 38 and 40, the cam drive arrangement provides an output signal which varies as a function of the positions of the various electrodes.

Figure 15:
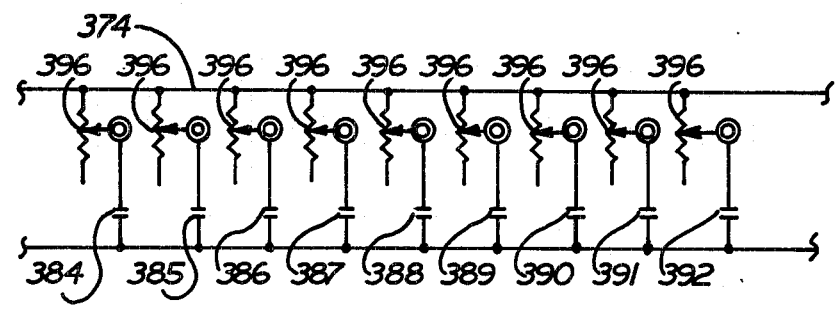
FIG. 15 is a schematic illustration of control circuitry utilized in association with the cam drive arrangement of FIG. 14 to effect a variation in the speed of movement of an electrode during a working stroke.
Figure 16:
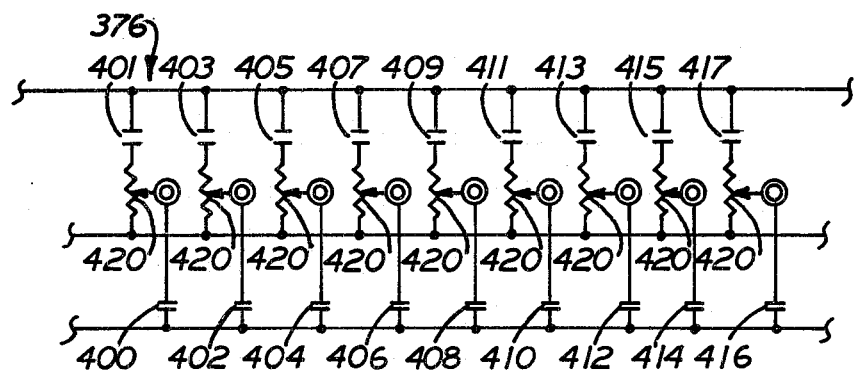
FIG. 16 is a schematic illustration of control circuitry utilized in connection with the cam arrangement of FIG. 14 to vary the electrical potential established between electrode and a workpiece during a working stroke.

Associated with a cam drive arrangement is a plurality of relays having contacts in the control circuit 374 and indicated at 384 through 392 in FIG. 15. Only one set of the contacts 384–392 is closed at any given time.

The speed at which the pump drive motors 80, 82, 84 and 86 (see FIG. 2) are driven is determined by the setting of a potentiometer 396 associated with the set of contacts 384–392 which is closed. By varying the settings of the potentiometers 396 and by effecting sequential closing of the contacts 384–392, the speed of operation of the pump drive motors 80–86 can be varied in a desired manner during the working strokes of the electrodes 26, 28, 30 and 32. Although the speed of movement of the electrodes could be varied in many different ways, it is contemplated that they will be moved at a relatively high speed during an initial portion of a working stroke and a relatively low speed during the final portion of the working stroke.

In addition to effecting variations in the speed of movement of the electrodes 26, 28, 30 and 32 relative to the workpiece, the cam controls 370 are utilized to effect variations in the electrical potential established between the electrodes and the workpiece during movement of the electrodes through a working stroke. Thus, in FIG. 16, relay contacts 400 through 417 are sequentially closed to connect a selected potentiometer 420 with controls for the rectifier 44 (see FIG. 2). Depending upon the setting of the potentiometers 420 and which contacts 400–417 are closed, the electrical potential established between the electrodes and the workpiece is varied. By varying both the speed of movement of the electrodes and the electrical potential established between the electrodes and the workpiece, a high degree of flexibility is obtained in determining the rate at which material is electrolytically removed from the workpiece. It should be understood that the cam control arrangement 370 and the associated circuits 374 and 376 could be utilized either in association with the photoelectric detectors 244 or separate therefrom.

The accurate forming of articles with the machine 20 is greatly facilitated by the ability to vary both the speed of movement of the electrodes 26, 28, 30 and 32 and the electrical potential established between the electrodes and the workpiece 24 during working strokes of the electrodes. However, if the electrodes are improperly positioned relative to each other and the workpiece, inaccuracies will still result even though the speed of movement of the electrodes and the electrical potential between the electrodes and the workpiece can be optimized. Accordingly, the position of the electrodes relative to the workpiece can be adjusted in any desired direction. To this end, cam wedges 450 and 452 (see FIG. 17) are provided in association with the electrode 30. The wedges 450 and 452 are provided with relatively thick end portions 454 and 456 and relatively thin end portions 458 and 460.

Figure 17:
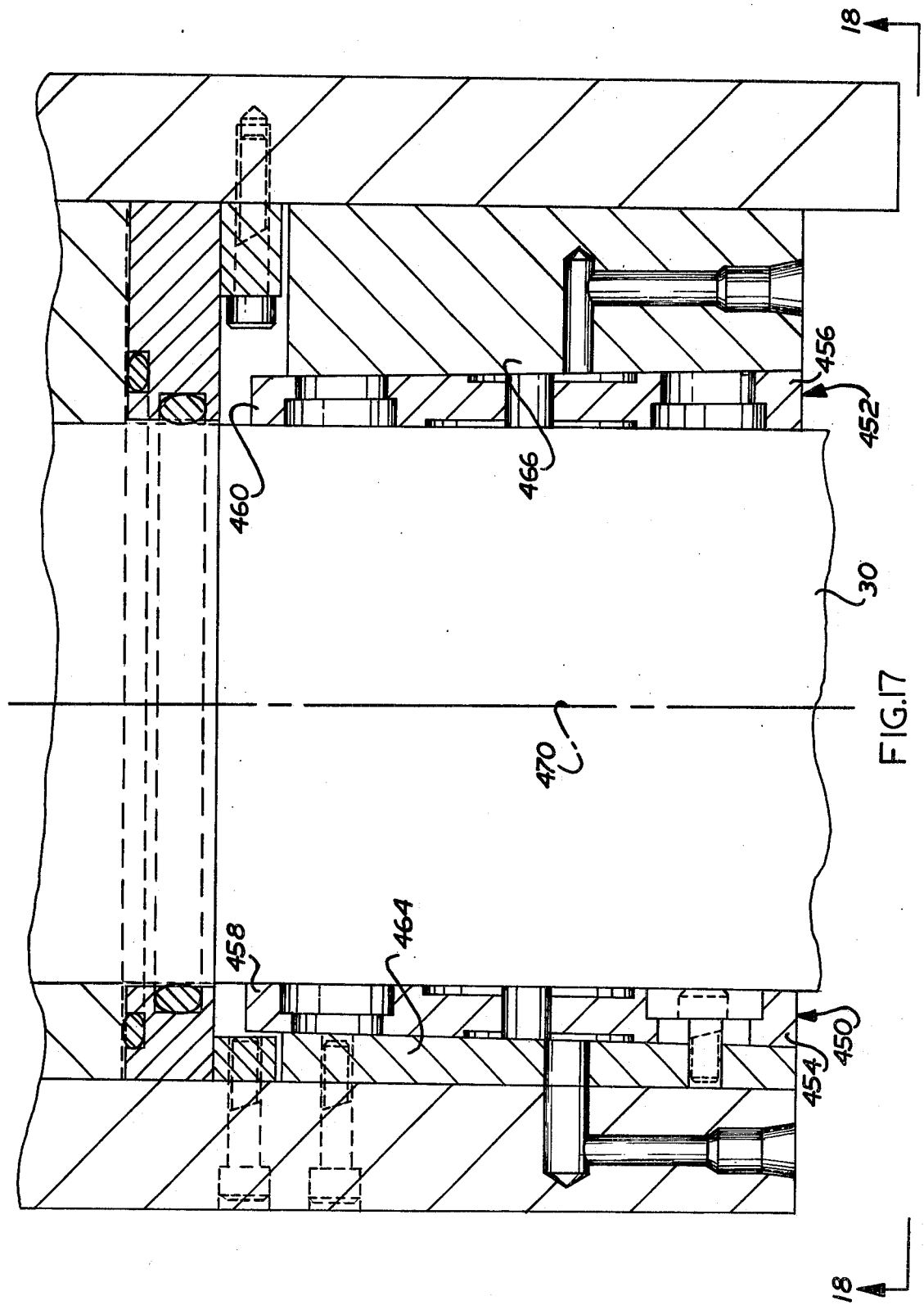
FIG. 17 is a plan view of an apparatus utilized to adjust the portion of an electrode relative to an axis extending perpendicular to a central axis of the electrode.

Upon movement of the wedge 450 upwardly (as viewed in FIG. 17) and the wedge 452 downwardly, the relatively thick end portion of the wedge 450 cams the electrode 30 toward the right (as viewed in FIG. 17). Similarly, upon movement of the wedge 452 upwardly (as viewed in FIG. 17) and the wedge 450 downwardly, the electrode 30 is cammed toward the left. It should be noted that the wedges 450 and 452 are mounted on similarly wedge shaped base members 464 and 466. Thus, upon movement of the wedges 450 and 452 relative to the base members 464 and 466 the electrode 30 is shifted sidewardly in a direction perpendicular to a central axis 407 of the electrode.

Figure 18:
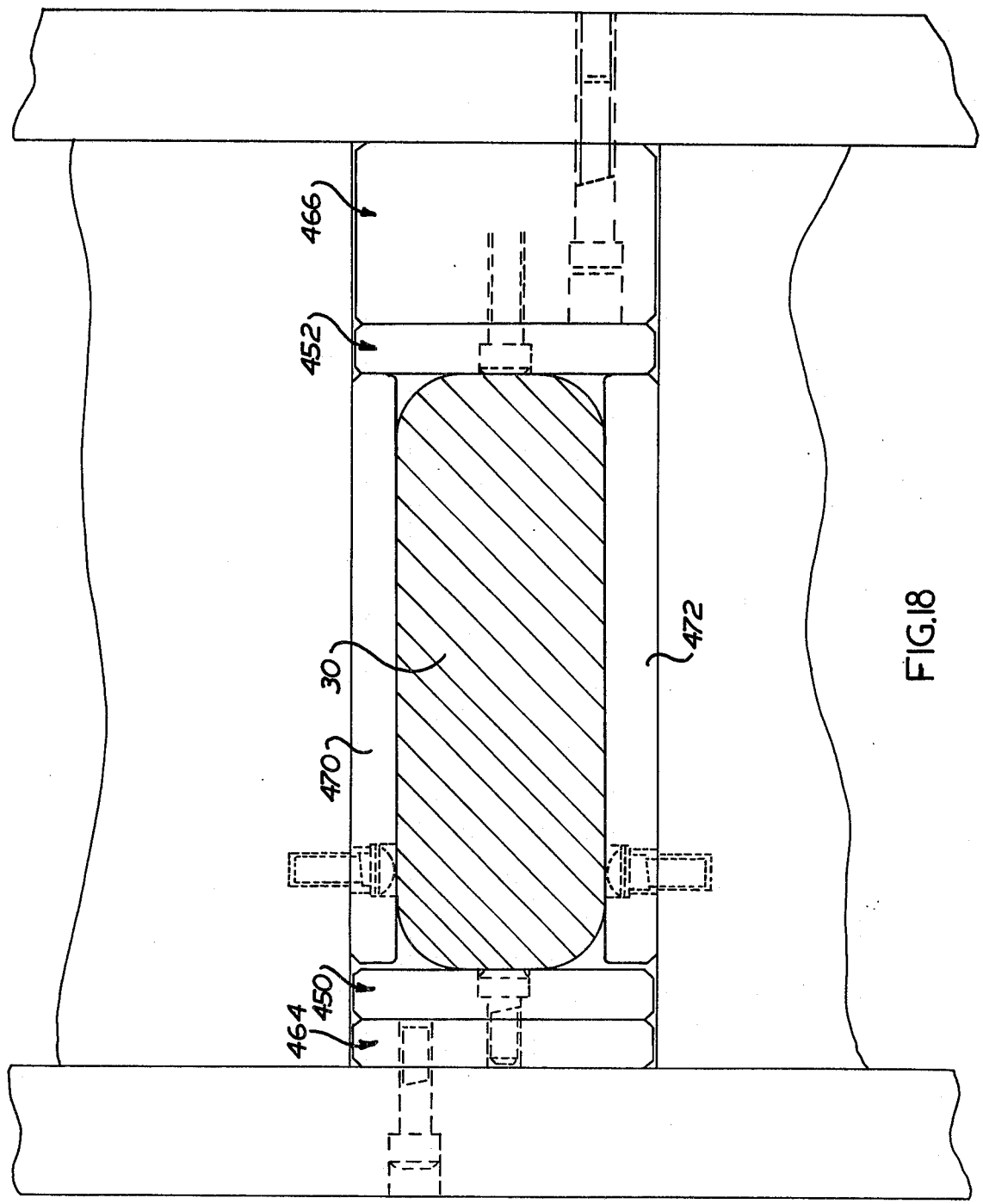
FIG. 18 is an elevational view, taken generally along the line 18—18 of FIG. 17, further illustrating the construction of the apparatus utilized to adjust the position of an electrode.

A pair of upper and lower wedge members 470 and 472 are movable in opposite directions axially along the electrode 30 to shift the electrode either upwardly or downwardly (as viewed in FIG. 18). This enables the position of the electrode 30 to be adjusted in a direction perpendicular to the central axis of the electrode and perpendicular to the central axis of the electrode and perpendicular to the direction in which the electrode is shifted by the wedge members 450 and 452.

In view of the foregoing description it is apparent that the present invention provides a new and improved apparatus 20 having a plurality of electrodes 26, 28, 30 and 32 which are movable to effect the electrolytic removal of material from a workpiece 24 while an electrical potential is established between each of the electrodes and the workpiece and while electrolyte is flowing between each of the electrodes and the workpiece. Due to differences in the material of the workpiece 24 and the drive assemblies utilized to move the electrodes, it is contemplated that certain electrodes may lag behind other electrodes as material is electrolytically removed from the workpiece. To coordinate the movement of the various electrodes, each of the electrodes 26, 28, 30 and 32 is moved to a predetermined intermediate position between the beginning and end of stroke positions. Once all the electrodes have arrived at predetermined intermediate positions, they are simultaneously moved from their intermediate positions toward their end of stroke positions. The number of times the electrodes 26, 28, 30 and 32 are stopped at intermediate positions between the beginning and end of stroke positions may vary depending upon the amount of material to be removed from the workpiece and other factors.

The electrode drive arrangements include relatively large electrode drive motors or rams 34, 36, 38 and 40 which are supplied with fluid from the relatively small pumps 70, 72, 74 and 76. Each of the pumps 70, 72, 74 and 76 has a relatively small diameter piston which is moved through a plurality of pumping strokes to discharge a volume of fluid large enough to effect movement of the associated relatively large diameter electrode ram through a distance corresponding to a working stroke of an electrode. Since positional error may be introduced upon a reversal in the direction of movement of a pump piston, it is preferred to interrupt movement of the electrodes 26, 28, 30 and 32 at predetermined intermediate positions which are very close to their end of stroke positions. The pistons of the various pumps 70, 72, 74 and 76 are then retunred to beginning of pumping stroke positions. The pistons are then moved through portions of pumping strokes to discharge sufficient fluid to effect movement of the electrode rams 34, 36, 38 and 40 through the short distance remaining in their working strokes.

A photoelectric detector unit 244 is utilized in association with each of the electrodes 26, 28, 30 and 32. When an associated electrode is moved to a predetermined position, a mark 334 is sensed by the associated photoelectric detector unit and an output signal effects initiation of a control function. Thus, output signals from the photoelectric detector units 244 are utilized to interrupt operation of the electrode drive assemblies when the electrodes 26, 28, 30 and 32 have been moved to predetermined intermediate positions. In addition, the photoelectric detector units are utilized to effect activation of the controller 296 to vary the speed of movement of the electrodes 26, 28, 30 and 32 and/or the electrical potential between the electrodes and a workpiece during a work stroke of the electrodes.

Having described one specific preferred embodiment of the invention, the following is claimed:

1. An apparatus for use in electrolytically removing material from a workpiece which is at least partially composed of an electrically conductive material, said apparatus comprising a plurality of movable electrode means for use in effecting the electrolytic removal of material from the workpiece, means for establishing an electrical potential between the workpiece and said plurality of electrode means, means for directing a flow of electrolyte between the workpiece and said plurality of electrode means, electrode drive means for moving each of said electrode means through a working stroke extending from a beginning of stroke position to an end of stroke position while an electrical potential is established between each of said electrode means and the workpiece and while electrolyte is flowing between each of said electrode means and the workpiece to effect the electrolytic removal of material from the workpiece during movement of said electrode means through their working strokes, and control means for interrupting movement of each of said electrode means when each of said electrode means arrives at a predetermined intermediate position disposed between the beginning of stroke and end of stroke positions and for initiating simultaneous movement of each of said electrode means from its intermediate position toward its end of stroke position under the influence of said electrode drive means after each of said electrode means has arrived at its intermediate position.

2. An apparatus as set forth in claim 1 wherein said electrode drive means includes a plurality of fluid motors, each of said fluid motors being connected with an associated one of said electrode means and being operable under the influence of a first predetermined volume of fluid to move the associated one of said electrode means through a working stroke, a plurality of fluid pumps, each of said fluid pumps being connected in fluid communication with an associated one of said fluid motors and being operable through a pumping cycle to discharge a second predetermined volume of fluid which is less than said first predetermined volume of fluid, pump motor means for driving said fluid pumps through their pumping cycles, said control means including means for effecting the initiation of operation of each of said fluid pumps at the beginning of a pumping cycle upon initiation of movement of each of said electrode means from its intermediate position, each of said fluid pumps being effective to discharge in one pumping cycle a volume of fluid sufficient to effect operation of each of said fluid motors to an extent necessary to move the associated one of said electrode means from its intermediate position to its end of stroke position.

3. An apparatus as set forth in claim 1 wherein said electrode drive means includes a plurality of electrode drive assemblies each of which is operable to move an associated one of said plurality of electrode means, said control means including means for detecting when one of said electrode means arrives at its predetermined intermediate position, for interrupting operation of the associated one of said drive assemblies when said one electrode means arrives at its predetermined intermediate position, and for initiating simultaneous movement of each of said plurality of electrode means from its intermediate position upon detection of arrival of all of said electrode means at their intermediate positions.

4. An apparatus as set forth in claim 1 wherein said control means includes means for effecting operation of said electrode drive means to stop movement of a leading one of said electrode means at its intermediate position at least until a trailing one of said electrode means arrives at its intermediate position, said control means further including means for interrupting the establishment of an electrical potential between the leading one of said electrode means and the workpiece at least a portion of the time while the leading one of said electrode means is stationary at its intermediate position.

5. An apparatus as set forth in claim 1 wherein said control means includes means for effecting operation of said electrode drive means to move each of said plurality of electrode means at a first speed during movement of each of said electrode means through an initial portion of its working stroke to its predetermined intermediate position to effect the electrolytic removal of material from the workpiece at a first rate during the initial portion of a working stroke and for effecting operation of said electrode drive means to move each of said electrode means away from its intermediate position toward its end of stroke position at a second speed which is different than said first speed to effect the electrolytic removal of material from the workpiece at a second rate.

6. An apparatus as set forth in claim 5 wherein each of said plurality of electrode means is movable toward the workpiece from a retracted position to its beginning of stroke position, said control means further including means for effecting operation of said electrode drive means to move each of said electrode means from its retracted position to its beginning of stroke position at a third speed which is different than said first speed.

7. An apparatus as set forth in claim 5 wherein said control means further includes means for varying the electrial potential established between the workpiece and each of said electrode means from a first potential to a second potential upon movement of each of said electrode means from a position immediately ahead of its intermediate position to a position immediately after its intermediate position.

8. An apparatus as set forth in claim 1 further including a plurality of target areas disposed in predetermined positions relative to the workpiece, each of said plurality of target areas being associated with one of said electrode means, said control means including a plurality of members each of which is connected with an associated one of said electrode means for movement therewith through one of said target areas, a first portion of each of said members having a first light reflecting characteristic, a second portion of each of said members having a second light reflecting characteristic and being positioned to move into one of said target areas upon movement of the associated one of said electrode means to its intermediate position, and a plurality of photoelectric means each of which is associated with one of said target areas for detecting when the light reflecting characteristic in the target area changes from said first characteristic to said second characteristic to detect when an associated one of said electrode means is moved to its intermediate position.

9. An apparatus as set forth in claim 1 further including a plurality of adjusting means each of which is associated with one of said electrode means for adjusting the position of the associated one of said electrode means along first and second axes extending perpendicular to each other and to the path of movement of the associated one of said electrode means through a working stroke to adjust the position of the associated one of said electrode means relative to the workpiece.

10. An apparatus as set forth in claim 1 wherein said control means further includes means for varying the electrical potential established between the workpiece and each of said electrode means from a first potential to a second potential upon movement of each of said electrode means from a position immediately ahead of its intermediate position to a position immediately after its intermediate position.

11. An apparatus for use in electrolytically removing material from a workpiece which is at least partially composed of an electrically conductive material, said apparatus comprising a plurality of movable electrode means for use in effecting the electrolytic removal of material from the workpiece, means for establishing an electrical potential between the workpiece and said plurality of electrode means, means for directing a flow of electrolyte between the workpiece and said plurality of electrode means, and electrode drive means for moving each of said electrode means through a working stroke while an electrical potential is established between each of said electrode means and the workpiece and while electrolyte is flowing between each of said electrode means and the workpiece to effect the electrolytic removal of material from the workpiece during movement of said electrode means through their working strokes, said electrode drive means including a plurality of fluid motors, each of said fluid motors being connected with an associated one of said electrode means and being operable under the influence of a first predetermined volume of fluid to move the associated one of said electrode means through a working stoke, a plurality of fluid pumps, each of said fluid pumps being connected in fluid communication with an associated one of said motors and being operable through a pumping stroke to discharge a second predetermined volume of fluid which is less than said first predetermined volume of fluid, and a plurality of motor means each of which is connected with an associated one of said fluid pumps for driving the associated one of said fluid pumps to discharge to the associated one of said fluid motors a volume of fluid which is at least as great as said first predetermined volume of fluid to thereby effect operation of the associated one of said fluid motors to move the associated one of said electrode means through a working stroke.

12. An apparatus as set forth in claim 11 wherein said electrode drive means further includes a plurality of force transmitting means each of which is connected with an associated one of said fluid pumps and motor means for transmitting force from the associated one of said motor means to the associated one of said fluid pumps, said force transmitting means including a nut disposed in engagement with a screw to effect relative movement therebetween.

13. An apparatus as set forth in claim 11 wherein each of said fluid pumps includes a piston and cylinder, each of said motor means being operable in one direction to effect relative movement between a piston and cylinder in a first direction and being operable in a direction opposite from said one direction to effect relative movement between the piston and cylinder in a second direction, said apparatus further including control means for effecting a reversal in the direction of operation of each of said motor means to thereby effect a reversal in the direction of relative movement between said pistons and cylinders.

14. An apparatus as set forth in claim 11 further including control means for effecting operation of each of said motor means at a first speed during one portion of a working stroke of an associated one of said electrode means to discharge fluid at a first rate from an associated one of said fluid pumps to an associated one of said fluid motors and for effecting operation of each of said motor means at a second speed which is less than said first speed during another portion of a working stroke of an associated one of said electrode means to discharge fluid from an associated one of said fluid pumps to an associated one of said fluid motors at a second rate which is less than said first rate to thereby effect movement of the associated one of said electrode means at a higher speed during the one portion of a working stroke than during the other portion of a working stroke.

15. An apparatus for use in electrolytically removing material from a workpiece which is at least partially composed of an electrically conductive material, said apparatus comprising a plurality of movable electrode means for use in effecting the electrolytic removal of material from the workpiece, means for establishing an electrical potential between the workpiece and said plurality of electrode means, means for directing a flow of electrolyte between the workpiece and said plurality of electrode means, a plurality of electrode drive means each of which is connected with an associated one of said electrode means for moving the associated one of said electrode means through a working stroke extending from a beginning of stroke position to an end of stroke position while an electrical potential is established between each of said electrode means and the workpiece and while electrolyte is flowing between each of said electrode means and the workpiece to effect the electrolytic removal of material from the workpiece during movement of said electrode means through their working strokes, a plurality of detector means each of which is associated with one of said electrode means for detecting when the associated one of said electrode means is at a predetermined intermediate position disposed between the beginning and end of stroke positions, and control for effecting a variation in the rate of electrolytic removal of material from the workpiece in response to detection by one of said detector means of movement of the associated one of said electrode means to its intermediate position.

16. An apparatus as set forth in claim 15 wherein each of said detector means includes photoelectric means for providing a signal in response to movement of the associated one of said electrode means to its intermediate position.

17. An apparatus as set forth in claim 15 wherein said control means includes means for effecting operation of each of said electrode drive means to move the associated one of said electrode means at a first speed relative to the workpiece prior to detection by said detector means of movement of the associated electrode means to its intermediate position and for effecting operation of each of said electrode drive means to move the associated one of said electrode means at a second speed relative to the workpiece after detection by said detector means of movement of the associated electrode means to its intermediate position.

18. An apparatus as set forth in claim 15 wherein said control means includes means for effecting interruption of operation of one of said electrode drive means upon movement of the associated one of said electrode means to its intermediate position.

19. An apparatus as set forth in claim 15 wherein said control means includes means for varying the electrical potential between one of said electrode means and the workpiece in response to detection by the one of said detector means associated with said one electrode means of movement of said one electrode means to its intermediate position.

20. An apparatus as set forth in claim 15 wherein said control means includes means for interrupting movement of each of said electrode means when each of said electrode means arrives at a predetermined intermediate position disposed between the beginning of stroke and end of stroke positions and for initiating simultaneous movement of each of said electrode means from its intermediate position toward its end of stroke position under the influence of said electrode drive means after each of said electrode means has arrived at its intermediate position.

21. An apparatus as set forth in claim 15 wherein said electrode drive means includes a plurality of fluid motors, each of said fluid motors being connected with an associated one of said electrode means and being operable under the influence of a first predetermined volume of fluid to move the associated one of said electrode means through a working stroke, a plurality of fluid pumps, each of said fluid pumps being connected in fluid communication with an associated one of said fluid motors and being operable through a pumping cycle to discharge a second predetermined volume of fluid which is less than said first predetermined volume of fluid, pump motor means for driving said fluid pumps through their pumping cycles, said control means including means for effecting the initiation of operation of each of said fluid pumps at the beginning of a pumping cycle upon initiation of movement of each of said electrode means from its intermediate position, each of said fluid pumps being effective to discharge in one pumping cycle a volume of fluid sufficient to effect operation of each of said fluid motors to an extent necessary to move the associated one of said electrode means from its intermediate position to its end of stroke position.

22. An apparatus as set forth in claim 15 wherein said electrode drive means includes a plurality of electrode drive assemblies each of which is operable to move an associated one of said plurality of electrode means, said control means including means for interrupting operation of the associated one of said drive assemblies when said one electrode means arrives at its predetermined intermediate position, and for initating simultaneous movement of each of said plurality of electrode means from its intermediate position upon detection of arrival of all of said electrode means at their intermediate positions.

23. An apparatus as set forth in claim 15 wherein said control means includes means for effecting operation of said electrode drive means to stop movement of a leading one of said electrode means at its intermediate position at least until a trailing one of said electrode means arrives at its intermediate position, said control means further including means for interrupting the establishment of an electrical potential between the leading one of said electrode means and the workpiece at least a portion of the time while the leading one of said electrode means is stationary at its intermediate position.

24. An apparatus for use in electrolytically removing material from a workpiece which is at least partially composed of an electrically conductive material, said apparatus comprising a plurality of movable electrode means for use in effecting the electrolytic removal of material from the workpiece, means for establishing an electrical potential between the workpiece and said plurality of electrode means, means for directing a flow of electrolyte between the workpiece and said plurality of electrode means, a plurality of electrode drive means each of which is connected with an associated one of said electrode means for moving the associated one of said electrode means through a working stroke extending from a beginning of stroke position to an end of stroke position while an electrical potential is established between each of said electrode means and the workpiece and while electrolyte is flowing between each of said electrode means and the workpiece to effect the electrolytic removal of material from the workpiece during movement of said electrode means through their working strokes, a plurality of detector means each of which is associated with one of said electrode means for detecting when the associated one of said electrode means is at a predetermined intermediate position disposed between the beginning and end of stroke positions, and control for effecting a control function in response to detection by one of said detector means of movement of the associated one of said electrode means to its intermediate position.

25. An apparatus as set forth in claim 24 wherein each of said detector means includes a member which is connected with an associated one of said electrode means for movement therewith, said member having a background area of a first light reflecting characteristic and a mark of a second light reflecting characteristic located a predetermined distance from a leading end portion of the associated one of said electrode means, and a light sensitive means which is associated with said member and is responsive to a change in light reflected from said member to detect when the mark on said member moves to a predetermined position relative to the workpiece, said control means including means for initiating a control function in response to detection of a mark on said member by said light sensitive means.

26. An apparatus as set forth in claim 24 wherein said control means includes means for varying the electrical potential between one of said electrode means and the workpiece upon detection by the associated one of detector means of movement of the associated one of said electrode means to its intermediate position.

27. An apparatus as set forth in claim 24 wherein said control means further includes means for effecting a change in the speed of movement of each of said electrode means from a first speed to a second speed in response to detection by the associated one of said detector means of movement of the associated one of said electrode means to its intermediate position.

28. An apparatus as set forth in claim 27 wherein each of said electrode drive means includes a fluid motor which is connected with an associated one of said electrode means and is operable under the influence of fluid pressure to move the associated one of said electrode means through a working stroke, a fluid pump which is connected in fluid communication with said fluid motor, and motor means for driving said fluid pump to discharge fluid at a first flow rate to said fluid motor during movement of said electrode means at the first speed and for driving said fluid pump to discharge fluid at a second flow rate to said fluid motor during movement of said electrode means at the second speed.

29. An apparatus as set forth in claim 24 wherein said control means includes means for effecting an interruption of operation of one of said electrode drive means upon detection by the associated one of said detector means of movement of the associated one of said electrode means to its intermediate position.

30. An apparatus as set forth in claim 24 wherein said control means includes means for interrupting movement of each of said electrode means in response to detection by the associated one of said detector means of movement of the associated one of said electrode means to its intermediate position and for initiating simultaneous movement of each of said electrode means from its intermediate position toward its end of stroke position under the influence of said plurality of electrode drive means after each of said detector means has detected the arrival of the associated one of said electrode means at its intermediate position.

31. An apparatus for use in electrolytically removing material from a workpiece which is at least partially composed of an electrically conductive material, said apparatus comprising a plurality of movable electrode means for use in effecting the electrolytic removal of material from the workpiece, means for establishing an electrical potential between the workpiece and said plurality of electrode means, means for directing a flow of electrolyte between the workpiece and said plurality of electrode means, electrode drive means for moving each of said electrode means through a working stroke extending from a beginning of stroke position to an end of stroke position while an electrical potential is established between each of said electrode means and the workpiece and while electrolyte is flowing between each of said electrode means and the workpiece to effect the electrolytic removal of material from the workpiece during movement of said electrode means through their working strokes, said electrode drive means including a plurality of fluid motors, each of said fluid motors being connected with an associated one of said electrode means and being operable under the influence of a first predetermined volume of fluid to move the associated one of said electrode means through a working stroke, a plurality of fluid pumps, each of said fluid pumps being connected in fluid communication with an associated one of said fluid motors and being operable through a pumping stroke to discharge a second predetermined volume of fluid which is different than said first predetermined volume of fluid, and a plurality of pump motor means for driving said fluid pumps through their pumping strokes, detector means for detecting when each of said electrode means arrives at a predetermined intermediate position disposed between its beginning and end of stroke positions, and control means for interrupting operation of the pump motor means associated with one of said electrode drive means when the associated one of said electrode means arrives at its predetermined intermediate position, and for initiating simultaneous operation of each of said plurality of pump motor means to effect simultaneous movement of each of said plurality of electrode means from its intermediate position upon detection of arrival of all of said electrode means at their intermediate positions, said control means including means for effecting the initiation of operation of each of said fluid pumps at the beginning of a pumping stroke upon initiation of movement of each of said electrode means from its intermediate position, each of said fluid pumps being effective to discharge in one pumping stroke a volume of fluid sufficient to effect operation of each of said fluid motors to an extent necessary to move the associated one of said electrode means from its intermediate position to its end of stroke position.

32. An apparatus as set forth in claim 31 wherein said control means includes means for effecting operation of each of said pump motor means to effect movement of each of said plurality of electrode means at a first speed during movement of each of said electrode means through an initial portion of its working stroke to its predetermined intermediate position to effect the electrolytic removal of material from the workpiece at a first rate during the initial portion of a working stroke and for effecting operation of each of said pump motor means to effect movement of each of said electrode means away from its intermediate position toward its end of stroke position at a second speed which is different than said first speed to effect the electrolytic removal of material from the workpiece at a second rate.

33. An apparatus as set forth in claim 32 wherein each of said plurality of electrode means is movable toward the workpiece from a retracted position to its beginning of stroke position, said control means further including means for effecting operation of each of said pump motor means to move each of said electrode means from its retracted position to its beginning of stroke position at a third speed which is different than said first speed.

34. An apparatus as set forth in claim 31 further including a plurality of target areas disposed in predetermined positions relative to the workpiece, each of said plurality of target areas being associated with one of said electrode means, said control means including a plurality of members each of which is connected with an associated one of said electrode means for movement therewith through one of said target areas, a first portion of each of said members having a first light reflecting characteristic, a second portion of each of said members having a second light reflecting characteristic and being positioned to move into one of said target areas upon movement of the associated one of said electrode means to its intermediate position, and a plurality of photoelectric means each of which is associated with one of said target areas for detecting when the light reflecting characteristic in the target area changes from said first characteristic to said second characteristic to detect when an associated one of said electrode means is moved to its intermediate position.

35. An apparatus as set forth in claim 31 further including a plurality of adjusting means each of which is associated with one of said electrode means for adjusting the position of the associated one of said electrode means along first and second axes extending perpendicular to each other and to the path of movement of the associated one of said electrode means through a working stroke to adjust the position of the associated one of said electrode means relative to the workpiece.

36. An apparatus as set forth in claim 31 wherein said control means further includes means for varying the electrical potential established between the workpiece and each of said electrode means from a first potential to a second potential upon movement of each of said electrode means from a position immediately ahead of its intermediate position to a position immediately after its intermediate position.

37. A method of electrolytically removing material from a workpiece which is at least partially composed of an electrically conductive material, said method comprising the steps of providing a plurality of movable electrodes, establishing an electrical potential between the workpiece and the plurality of electrodes, directing a flow of electrolyte between the workpiece and the plurality of electrodes, moving each of the electrodes through a working stroke extending from a beginning of stroke position to an end of stroke position while the electrical potential is established between each of the electrodes and the workpiece and while electrolyte is flowing between each of the electrodes and the workpiece to effect the electrolytic removal of material from the workpiece during movement of the electrodes through their working strokes, interrupting movement of each of the electrodes when each of the electrodes arrives at a predetermined intermediate position disposed between its beginning of stroke and end of stroke positions, and initiating simultaneous movement of each of the electrodes from its intermediate position towards its end of stroke position after each of the electrodes has arrived at its intermediate position.

38. A method as set forth in claim 37 further including the step of interrupting the establishment of an electrical potential between the electrodes and the workpiece at least a portion of the time while the electrodes are stationary at their intermediate positions.

39. A method as set forth in claim 37 wherein said step of moving each of the electrodes through a working stroke includes the step of moving each of the plurality of electrodes at a first speed during movement of each of the electrodes through an initial portion of its working stroke to its predetermined intermediate position to effect the electrolytic removal of material from the workpiece at a first rate during the initial portion of a working stroke and moving each of said electrodes away from its intermediate position toward its end of stroke position at a second speed which is less than said first speed to effect the electrolytic removal of material from the workpiece at a second rate.

40. A method as set forth in claim 39 further including the steps of moving each of the electrodes from a retracted position to its beginning of stroke position at a third speed which is greater than said first speed.

41. A method as set forth in claim 37 further including the steps of varying the electrical potential established between each of the electrodes from a first potential to a second potential upon movement of each of the electrodes from a position immediately ahead of its intermediate position to a position immediately after its intermediate position.

42. An apparatus for use in electrolytically removing material from a workpiece which is at least partially composed of an electrically conductive material, said apparatus comprising a plurality of pairs of movable electrode means for use in effecting the electrolytic removal of material from the workpiece, means for establishing an electrical potential between the workpiece and said plurality of pairs of electrode means, means for directing a flow of electrolyte between the workpiece and said plurality of pairs of electrode means, electrode drive means for simultaneously moving each of said electrode means toward the workpiece through working strokes while an electrical potential is established between each of said electrode means and the workpiece and while electrolyte is flowing between each of said electrode means and the workpiece during movement of said electrode means through their working strokes, and control means for effecting operation of said electrode drive means to move each of said electrode means at a first speed during one portion of a working stroke to effect the electrolytic removal of material from the workpiece at a first rate during the one portion of a working stroke and for effecting operation of said electrode drive means to move each of said electrode means at a second speed during another portion of a working stroke to effect the electrolytic removal of material from the workpiece at a second rate during the other portion of a working stroke, said control means including means for varying the electrical potential between each of said electrode means and the workpiece upon a variation in the speed of movement of said electrode means from the first speed to the second speed.

43. An apparatus as set forth in claim 42 wherein said control means further includes means for detecting when each of said electrode means is in a predetermined position relative to the workpiece during a working stroke and means for effecting a change in the speed of movement of each of said electrode means from the first speed to the second speed in response to arrival of each of said electrode means at its predetermined position.

44. An apparatus as set forth in claim 42 wherein each of said electrode means is movable from a retracted position to a beginning of working stroke position, said control means further including means for effecting operation of said electrode drive means to move each of said electrode means from its retracted position to its beginning of working stroke position at a third speed which is greater than said first and second speeds.

45. An apparatus as set forth in claim 42 wherein said control means further includes a plurality of members each of which is connected with an associated one of said electrode means for movement therewith, each of said members having a background area of a first light reflecting characteristic and a mark of a second light reflecting characteristic located a predetermined distance from a leading end portion of the associated one of said electrode means, and a plurality of light sensitive means each of which is associated with one of said members and is responsive to a change in light reflected from the associated one of said members to detect when the mark on the associated one of said members moves to a predetermined position relative to the workpiece, and means for effecting operation of each of said electrode drive means to change the speed of movement of an associated one of said electrode means from the first speed to the second speed in response to detection of a mark on an associated one of said members by the associated one of said light sensitive means.

46. An apparatus for use in electrolytically removing material from a workpiece which is at least partially composed of an electrically conductive material, said apparatus comprising a plurality of movable electrode means for use in effecting the electrolytic removal of material from the workpiece, means for establishing an electrical potential between the workpiece and said plurality of electrode means, means for directing a flow of electrolyte between the workpiece and said plurality of electrode means, electrode drive means for moving each of said electrode means through a working stroke while an electrical potential is established between each of said electrode means and the workpiece and while electrolyte is flowing between each of said electrode means and the workpiece during movement of said electrode means through their working strokes, said electrode drive means includes a plurality of fluid motors each of which is connected with an associated one of said electrode means and being operable under the influence of fluid pressure to move the associated one of said electrode means through a working stroke, a plurality of fluid pumps each of which is connected in fluid communication with an associated one of said fluid motors, and motor means for driving said fluid pumps to discharge fluid to said fluid motors during movement of said electrode means, and control means for effecting operation of said electrode drive means to move each of said electrode means at a first speed during one portion of a working stroke to effect the electrolytic removal of material from the workpiece at a first rate during the one portion of a working stroke and for effecting operation of said electrode drive means to move each of said electrode means at a second speed during another portion of a working stroke to effect the electrolytic removal of material from the workpiece at a second rate during the other portion of a working stroke, said control means including means for effecting operation of said motor means to drive said fluid pumps to discharge fluid at a first flow rate to said fluid motors during movement of said electrode means at the first speed and for effecting operation of said motor means to drive said fluid pumps to discharge fluid at a second flow rate to said fluid motors during movement of said electrode means at the second speed.

47. An apparatus as set forth in claim 46 wherein said motor means includes a plurality of motors each of which is connected with one of said fluid pumps, said control means further includes means for detecting when each of said electrode means is in a predetermined position relative to the workpiece during a working stroke and means for effecting a change in the speed of operation of each of said motors to change the rate at which fluid is discharged by said fluid pumps in response to arrival of each of said electrode means at its predetermined position.

48. An apparatus as set forth in claim 47 wherein said control means further includes means for varying the electrical potential between each of said electrode means and the workpiece upon a variation in the speed of movement of said electrode means from the first speed to the second speed.

49. An apparatus as set forth in claim 46 wherein each of said electrode means is movable from a retracted position to a beginning of working stroke position, said control means further including means for effecting operation of said motor means to drive said fluid pumps to discharge fluid at a third flow rate to said fluid motors to move each of said electrode means from its retracted position to its beginning of working stroke position at a third speed which is greater than said first and second speeds.

50. An apparatus as set forth in claim 46 wherein said control means further includes a plurality of members each of which is connected with an associated one of said electrode means for movement therewith, each of said members having a background area of a first light reflecting characteristic and a mark of a second light reflecting characteristic located on a predetermined distance from a leading end portion of the associated one of said electrode means, and a plurality of light sensitive means each of which is associated with one of said members and is responsive to a change in light reflected from the associated one of said members to detect when the mark on the associated one of said members moves to a predetermined position relative to the workpiece, and means for effecting operation of each of said electrode drive means to change the speed of movement of an associated one of said electrode means from the first speed to the second speed in response to detection of a mark on an associated one of said members by the associated one of said light sensitive means.

51. An apparatus as set forth in claims 46 wherein said control means further includes means for varying the electrical potential between each of said electrode means and the workpiece upon a variation in the speed of movement of said electrode means from the first speed to the second speed.

52. An apparatus for use in electrolytically removing material from a workpiece which is at least partially composed of an electrically conductive material, said apparatus comprising a movable electrode means for use in effecting the electrolytic removal of material from the workpiece, means for establishing an electrical potential between the workpiece and said electrode means, means for directing a flow of electrolyte between the workpiece and said electrode means, electrode drive means for moving said electrode means through a working stroke extending from a beginning of stroke position to an end of stroke position while an electrical potential is established between said electrode means and the workpiece and while electrolyte is flowing between said electrode means and the workpiece during movement of said electrode means through its working stroke, said electrode drive means including a fluid motor, said fluid motor being connected with said electrode means and being operable under the influence of a first predetermined volume of fluid to move said electrode means through a working stroke, a fluid pump, said fluid pump being connected in fluid communication with said fluid motor and being operable through a pumping stroke to discharge a second predetermined volume of fluid which is different than said first predetermined volume of fluid, and pump motor means for driving said fluid pump through its pumping stroke, detector means for detecting when said electrode means arrives at a predetermined intermediate position disposed between its beginning and end of work stroke positions, and control means for interrupting operation of said pump motor means when said electrode means arrives at its predetermined intermediate position and for initiating operation of said pump motor means to effect movement of said electrode means from its intermediate position, said control means including means for effecting the initiation of operation of said fluid pump at the beginning of a pumping stroke upon initiation of movement of said electrode means from its intermediate position, said fluid pump being effective to discharge in one pumping stroke a volume of fluid sufficient to effect operation of said fluid motor to an extent necessary to move said electrode means from its intermediate position to its end of stroke position.

53. An apparatus as set forth in claim 52 wherein said control means further includes means for interrupting the establishment of an electrical potential between said electrode means and the workpiece at least a portion of the time while said electrode means is at its intermediate position.

54. An apparatus as set forth in claim 52 wherein said control means includes means for effecting operation of said electrode drive means to move said electrode means at a first speed during movement of said electrode means through an initial portion of its working stroke to its predetermined intermediate position to effect the electrolytic removal of material from the workpiece at a first rate during the initial portion of a working stroke and for effecting operation of said electrode drive means to move said electrode means away from its intermediate position toward its end of stroke position at a second speed which is different than said first speed to effect the electrolytic removal of material from the workpiece at a second rate.

55. An apparatus as set forth in claim 54 wherein said electrode means is movable toward the workpiece from a retracted position to its beginning of stroke position, said control means further including means for effecting operation of each of said pump motor means to move said electrode means from its retracted position to its beginning of stroke position at a third speed which is different than said first speed.

56. An apparatus as set forth in claim 52 further including a target area disposed in predetermined positions relative to the workpiece, said target area being associated with said electrode means, said control means including a member which is connected with said electrode means for movement therewith through said target area, a first portion of said member having a first light reflecting characteristic, a second portion of said member having a second light reflecting characteristic and being positioned to move into said target area upon movement of said electrode means to its intermediate position, and photoelectric means associated with said target area for detecting when the light reflecting characteristic in the target area changes from said first characteristic to said second characteristic to detect when said electrode means is moved to its intermediate position.

57. An apparatus as set forth in claim 52 further including adjusting means which is associated with said electrode means for adjusting the position of said electrode means along first and second axes extending perpendicular to each other and to the path of movement of said electrode means through a working stroke to adjust the position of said electrode means relative to the workpiece.

58. An apparatus as set forth in claim 52 wherein said control means further includes means for varying the electrical potential established between the workpiece and said electrode means from a first potential to a second potential upon movement of said electrode means from a position immediately ahead of its intermediate position to a position immediately after its intermediate position.

59. An apparatus for use in electrolytically removing material from a workpiece which is at least partially composed of an electrically conductive material, said apparatus comprising electrode means for use in effecting the electrolytic removal of material from the workpiece, means for establishing an electrical potential between the workpiece and said electrode means, means for directing a flow of electrolyte between the workpiece and said electrode means, electrode drive means for moving said electrode means through a working stroke while an electrical potential is established between said electrode means and the workpiece and while electrolyte is flowing between said electrode means and the workpiece, and control means for effecting operation of said electrode drive means to move said electrode means at a first speed during one portion of a working stroke to effect the electrolytic removal of material from the workpiece at a first rate during the one portion of a working stroke and for effecting operation of said electrode drive means to move said electrode means at a second speed during another portion of a working stroke to effect the electrolytic removal of material from the workpiece at a second rate during the other portion of a working stroke, said control means including detector means for detecting the position of said electrode means relative to the workpiece, means for effecting a change in the speed of movement of said electrode means from the first speed to the second speed in response to said detector means detecting that said electrode means has moved to a predetermined position relative to the workpiece, and means for varying the electrical potential between said electrode means and the workpiece upon a variation in the speed of movement of said electrode means from the first speed to the second speed.

60. An apparatus as set forth in claim 59 wherein said electrode drive means includes a fluid motor which is connected with said electrode means and is operable under the influence of fluid pressure to move said electrode means through a working stroke, a fluid pump which is connected in fluid communication with said fluid motor, and motor means for driving said fluid pump to discharge fluid at a first flow rate to said fluid motor during movement of said electrode means at the first speed and for driving said fluid pump to discharge fluid at a second flow rate to said fluid motor during movement of said electrode means at the second speed.

61. An apparatus as set forth in claim 59 wherein said electrode means is movable from a retracted position to a beginning of working stroke position, said control means further including means for effecting operation of said electrode drive means to move said electrode means from its retracted position to its beginning of working stroke position at a third speed which is greater than said first and second speeds.

62. A method of electrolytically removing material from a workpiece which is at least partially composed of an electrically conductive material, said method comprising the steps of providing a plurality of movable electrodes, establishing an electrical potential between the workpiece and the plurality of electrodes, directing a flow of electrolyte between the workpiece and the plurality of electrodes, moving each of the electrodes through a working stroke extending from a beginning of stroke position to an end of stroke position while an electrical potential is established between each of the electrodes and the workpiece and while electrolyte is flowing between each of the electrodes and the workpiece to effect the electrolyte removal of material from the workpiece during movement of the electrodes through their working strokes, detecting when each of the electrodes is at a predetermined intermediate position disposed between its beginning and end of stroke positions, said step of moving each of the electrodes includes moving each of the electrodes at a first speed relative to the workpiece prior to movement of the electrode to its intermediate position and moving each of the electrodes at a second speed relative to the workpiece after movement of the electrode to its intermediate position, said method further including the step of varying the electrical potential between each of the electrodes and the workpiece in response to movement of each of the electrodes to its intermediate position.

* * * * *